(12) United States Patent
Imai et al.

(10) Patent No.: US 11,597,079 B2
(45) Date of Patent: Mar. 7, 2023

(54) ROBOT APPARATUS, ROBOT SYSTEM, ROBOT CONTROL METHOD, AND STORAGE MEDIUM

(71) Applicant: HONDA MOTOR CO., LTD., Tokyo (JP)

(72) Inventors: Naoko Imai, Wako (JP); Takeyuki Suzuki, Wako (JP); Yasushi Ikeuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 581 days.

(21) Appl. No.: 16/596,792

(22) Filed: Oct. 9, 2019

(65) Prior Publication Data
US 2020/0156242 A1 May 21, 2020

(30) Foreign Application Priority Data
Nov. 21, 2018 (JP) .............................. JP2018-218358

(51) Int. Cl.
*B25J 9/00* (2006.01)
*B25J 9/16* (2006.01)

(52) U.S. Cl.
CPC ............. *B25J 9/163* (2013.01); *B25J 9/0084* (2013.01); *G05B 2219/33034* (2013.01); *G05B 2219/39135* (2013.01)

(58) Field of Classification Search
CPC ....................................... B25J 9/00; B25J 9/16
See application file for complete search history.

(56) References Cited

U.S. PATENT DOCUMENTS

| 9,840,007 B1 | 12/2017 | Kuffner |
| 2009/0070881 A1* | 3/2009 | Yellepeddy ......... G06F 21/6245 726/26 |
| 2011/0054685 A1* | 3/2011 | Wada ..................... B25J 9/1664 700/252 |

(Continued)

FOREIGN PATENT DOCUMENTS

| CN | 104220219 | 12/2014 |
| CN | 104793579 | 7/2015 |

(Continued)

OTHER PUBLICATIONS

Japanese Office Action for Japanese Patent Application No. 2018-218358 dated Aug. 18, 2020.

(Continued)

*Primary Examiner* — Kira Nguyen
(74) *Attorney, Agent, or Firm* — Amin, Turocy & Watson, LLP

(57) ABSTRACT

A robot apparatus includes a storage that stores first instructional information which serves as a guide to first work operation, an acquirer that acquires second instructional information which serves as a guide to second work operation similar to the first work operation or second work operation related to the first work operation from a different apparatus having the second instructional information, and a work controller that performs the first work operation based on the first instructional information stored in the storage and the second work operation based on the second instructional information acquired by the acquirer.

10 Claims, 18 Drawing Sheets

(56) References Cited

U.S. PATENT DOCUMENTS

| | | | |
|---|---|---|---|
| 2015/0019012 A1* | 1/2015 | Yoshida | B25J 9/163 700/248 |
| 2015/0314438 A1* | 11/2015 | Namba | G05B 19/0426 901/3 |
| 2016/0279793 A1* | 9/2016 | Sisbot | B25J 9/1674 |
| 2017/0028553 A1* | 2/2017 | Tsuda | B25J 9/0084 |
| 2019/0160682 A1* | 5/2019 | Sato | B25J 9/1664 |
| 2019/0262990 A1* | 8/2019 | Grollman | G05B 19/042 |
| 2019/0310655 A1* | 10/2019 | Voorhies | B66F 9/063 |
| 2020/0311616 A1* | 10/2020 | Rajkumar | G06N 5/043 |

FOREIGN PATENT DOCUMENTS

| | | |
|---|---|---|
| CN | 105773615 | 7/2016 |
| CN | 107838922 | 3/2018 |
| CN | 108333941 | 7/2018 |
| JP | 2003-144453 | 5/2003 |
| JP | 2013-071231 | 4/2013 |
| JP | 2013-109594 | 6/2013 |
| WO | 2013/150599 | 10/2013 |

OTHER PUBLICATIONS

Chinese Office Action for Chinese Patent Application No. 201911035096.4 dated Aug. 26, 2022.

\* cited by examiner

266A

| FIRST ARM PORTION | |
|---|---|
| IMAGE | SCENARIO OF DRIVE COMMAND VALUE |
| 001 | * * |
| 002 | * * |
| 003 | * * |
| ⋮ | ⋮ |

| SURROUNDING ENVIRONMENT | DRIVE COMMAND VALUE | DISCLOSURE RANGE |
|---|---|---|
| E001 | ** | NO LIMITATION |
| E002 | ** | NO LIMITATION |
| E003 | ** | APPARATUSES WITH AUTHORIZATION A |
| E004 | ** | APPARATUSES WITH AUTHORIZATION B |
| ⋮ | ⋮ | ⋮ |

ROBOT APPARATUS, ROBOT SYSTEM, ROBOT CONTROL METHOD, AND STORAGE MEDIUM

CROSS-REFERENCE TO RELATED APPLICATION

Priority is claimed on Japanese Patent Application No. 2018-218358, filed Nov. 21, 2018, the content of which is incorporated herein by reference.

BACKGROUND OF THE INVENTION

Field of the Invention

The present invention relates to a robot apparatus, a robot system, a robot control method, and a storage medium.

Description of Related Art

In the related art, a robot apparatus retains a movement trajectory in which an operation unit of a robot moved based on a force applied by a person as teaching data. This robot apparatus reproduces the movement trajectory in the retained teaching data when repeating the operation (Japanese Unexamined Patent Application, First Publication No. 2013-71231).

However, when a plurality of robot apparatuses as described above individually learn an operation, there is a need for a person to teach a movement to the operation units of the robots, and therefore various problems are caused. For example, there are cases where the robots vary in workability depending on a person performing teaching. Since there is a need to individually perform teaching for each of the robot apparatuses, teaching may become burdensome.

SUMMARY OF THE INVENTION

The present invention has been made in consideration of such circumstances, and an object thereof is to provide a robot apparatus, a robot system, a robot control method, and a storage medium, in which capability can be improved more simply.

A robot apparatus according to this invention employs the following configuration.

(1): According to an aspect of this invention, there is provided a robot apparatus including a storage configured to store first instructional information which serves as a guide to first work operation, an acquirer configured to acquire second instructional information which serves as a guide to second work operation similar to the first work operation or second work operation related to the first work operation from a different apparatus having the second instructional information, and a work controller configured to perform the first work operation based on the first instructional information stored in the storage and the second work operation based on the second instructional information acquired by the acquirer.

(2): According to the aspect of (1), the robot apparatus further includes a learner configured to learn a guide to third work, and an information provider configured to notify a different apparatus of information indicating that the guide to the third work has been learned, in a case where the learner learns the guide to the third work.

(3): According to the aspect of (1) or (2), the robot apparatus further includes an instructor configured to instruct a person regarding work, a learner configured to learn a method for coping with specific work based on instruction information for instructing a person regarding the newly acquired specific work when the specific work occurs in a case where the instructor instructs a person regarding predetermined work. The specific work is work the robot apparatus cannot instruct the person. The instructor instructs a person regarding the specific work based on a learned result of the learner.

(4): There is provided a robot system including the robot apparatus according to (3), and an estimator configured to estimate a skill learning level of the robot apparatus based on a frequency of occurrence of the specific work in a predetermined environment.

(5): There is provided a robot system including the robot apparatus according to any one of (1) to (3), a secret determiner configured to determine whether or not instructional information which is a guide to work transmitted by the robot apparatus is secret information, and a provider configured to provide the instructional information to a different apparatus in response to a request of the different apparatus in a case where the secret determiner determines that the instructional information is not secret information, and not to provide the instructional information to a different apparatus even if there is a request from the different apparatus in a case where the secret determiner determines that the instructional information is secret information.

(6): According to the aspect of (5), in the robot system, the secret determiner determines whether or not information matching the information transmitted by the robot apparatus is open to the public and determines that the instructional information is not secret information in a case where the secret determiner determines that the information transmitted by the robot apparatus is open to the public.

(7): According to another aspect of this invention, there is provided a robot control method in which a computer of a robot apparatus acquires second instructional information which serves as a guide to second work operation similar to first work operation or second work operation related to the first work operation from a different apparatus having the second instructional information, and performs the first work operation based on first instructional information stored in a storage storing the first instructional information which serves as a guide to the first work operation and the second work operation based on the acquired second instructional information.

(8): According to another aspect of this invention, there is provided a non-transitory computer-readable storage medium that stores a computer program to be executed by a computer to at least acquire second instructional information which serves as a guide to second work operation similar to first work operation or second work operation related to the first work operation from a different apparatus having the second instructional information, and perform the first work operation based on first instructional information stored in a storage storing the first instructional information which serves as a guide to the first work operation and the second work operation based on the acquired second instructional information.

According to (1), (2), (7), and (8), capability of the robot apparatus can be improved more simply.

According to (3), since a person is instructed regarding work, capability of the person can be improved more simply.

According to (4), the skill learning level of the robot apparatus can be recognized more easily.

According to (5) and (6), information which should not be open to the public can be managed more easily.

BRIEF DESCRIPTION OF THE DRAWINGS

FIG. 14 is a view showing an example of details of administrative information.

DETAILED DESCRIPTION OF THE INVENTION

Hereinafter, with reference to the drawings, embodiments of a robot apparatus, a robot system, a robot control method, and a storage medium according to the present invention will be described.

First Embodiment

Figure 1:
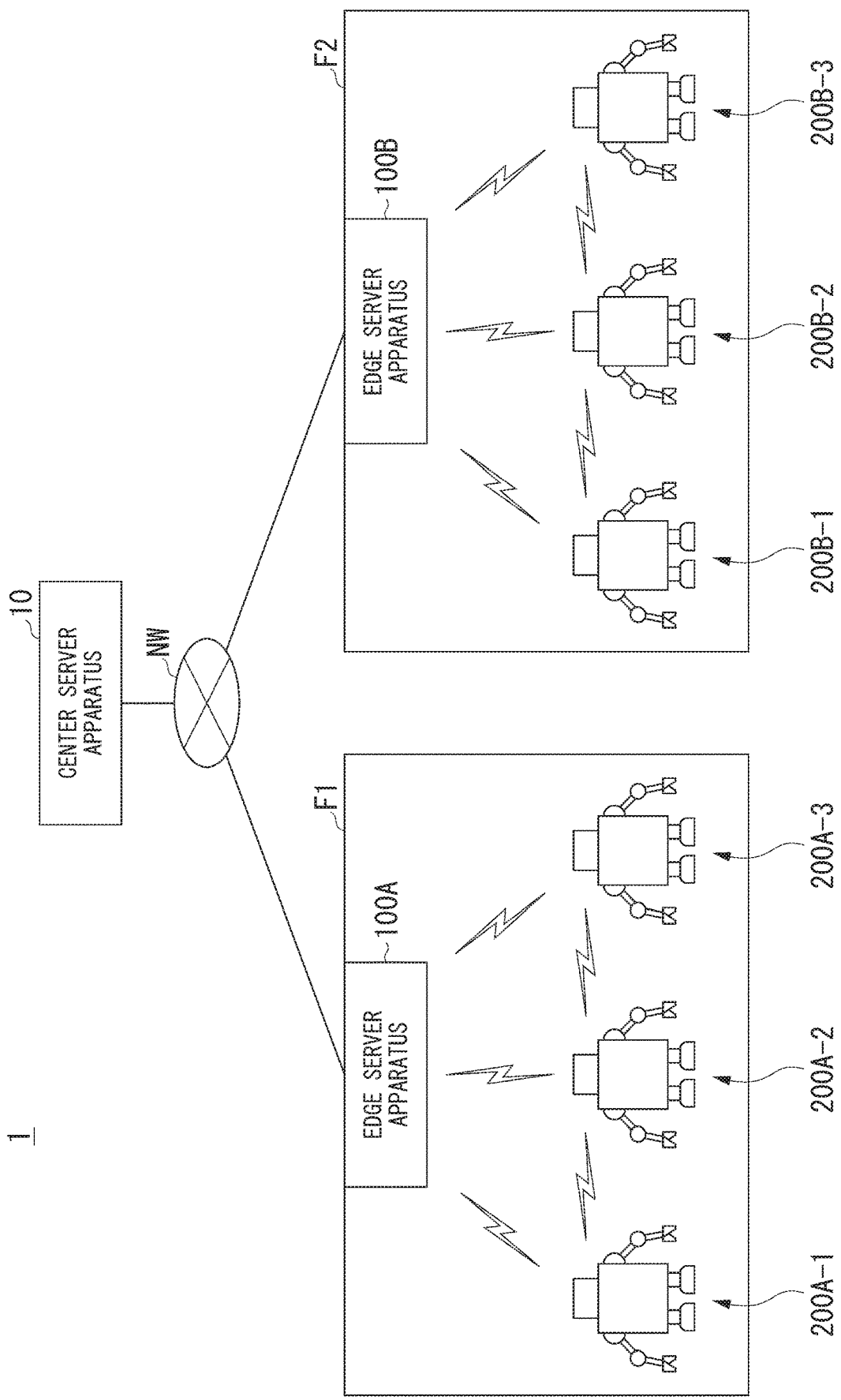
FIG. 1 is a view showing an example of a configuration of a robot system.

FIG. 1 is a view showing an example of a configuration of a robot system 1. For example, the robot system 1 includes one or more center server apparatuses 10, one or more edge server apparatuses 100 (for example, 100A, 100B), and one or more robot apparatuses (200A-1 to 200A-3, 200B-1 to 200B-3).

The center server apparatus 10 and the edge server apparatuses 100 communicate with each other via a network NW. Examples of the network NW include the Internet, a wide area network (WAN), a local area network (LAN), a provider apparatus, and a radio base station.

The edge server apparatus 100A and the robot apparatuses 200A-1 to 200A-3 are provided in a facility F1. For example, the edge server apparatus 100A and the robot apparatuses 200A-1 to 200A-3 perform radio communication. The robot apparatuses 200A-1 to 200A-3 perform radio communication with each other.

The edge server apparatus 100B and the robot apparatuses 200B-1 to 200B-3 are provided in a facility F2. For example, the edge server apparatus 100B and the robot apparatuses 200B-1 to 200B-3 perform radio communication. The robot apparatuses 200B-1 to 200B-3 perform radio communication with each other.

Hereinafter, in a case where the edge server apparatus 100A and the edge server apparatus 100B are not distinguished from each other, an edge server apparatus will be simply referred to as "an edge server apparatus 100", and in a case where the robot apparatuses 200A-1 to 200A-3 and the robot apparatuses 200B-1 to 200B-3 are not distinguished from each other, a robot apparatus will be simply referred to as "a robot apparatus 200".

[Center Server Apparatus]

Figure 2:
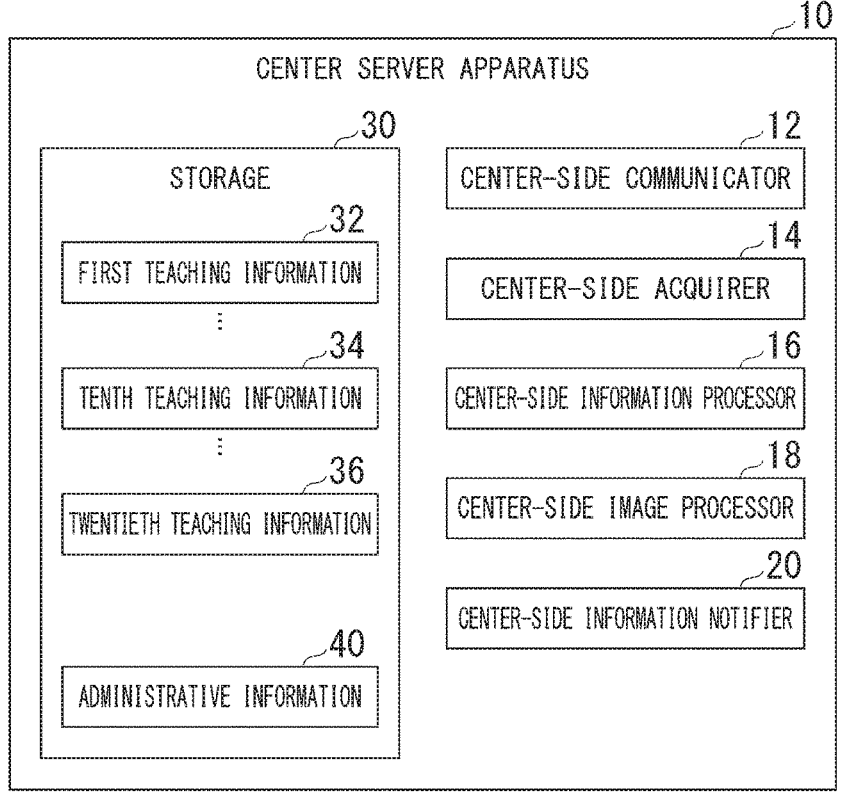
FIG. 2 is a view showing an example of a functional configuration of a center server apparatus.

FIG. 2 is a view showing an example of a functional configuration of the center server apparatus 10. For example, the center server apparatus 10 includes a center-side communicator 12, a center-side acquirer 14, a center-side information processor 16, a center-side image processor 18, a center-side information notifier 20, and a storage 30. For example, the center-side acquirer 14, the center-side information processor 16, the center-side image processor 18, and the center-side information notifier 20 are executed by a hardware processor such as a central processing unit (CPU) executing a program (software). Some or all of these constituent elements may be executed by hardware (a circuit; including circuitry) such as a large scale integration (LSI), an application specific integrated circuit (ASIC), a field-programmable gate array (FPGA), or a graphics processing unit (GPU) or may be executed by software and hardware in cooperation. The program may be stored in a storage device (non-transitory storage medium) such as a hard disk drive (HDD) or a flash memory in advance or may be stored in a detachable storage medium (non-transitory storage medium) such as a DVD or a CD-ROM such that the program is installed in a case where the storage medium is mounted in a drive device.

For example, the storage 30 is realized by an HDD, a flash memory, an electrically erasable programmable read only memory (EEPROM), a read only memory (ROM), a random access memory (RAM), or the like.

The center-side communicator 12 is a communication unit which communicates with the edge server apparatus 100 via the network NW.

The center-side acquirer 14 acquires information obtained by the center-side communicator 12 through communication with the edge server apparatus 100.

The center-side information processor 16 manages information acquired and generated by the edge server apparatus 100.

In a case where the robot apparatus 200 (which will be described below) learns a guide to predetermined work, the center-side information notifier 20 notifies the edge server apparatus 100 of information indicating that the robot apparatus 200 has learned the guide to the predetermined work. A guide denotes information used in a case where the robot apparatus 200 performs work and is information related to an operation, for example.

For example, the storage 30 stores information (for example, first teaching information 32, so on to tenth teaching information 34, and so on to twentieth teaching information 36) provided by the edge server apparatus 100, and administrative information 40 (which will be described below in detail).

[Edge Server Apparatus]

Figure 3:
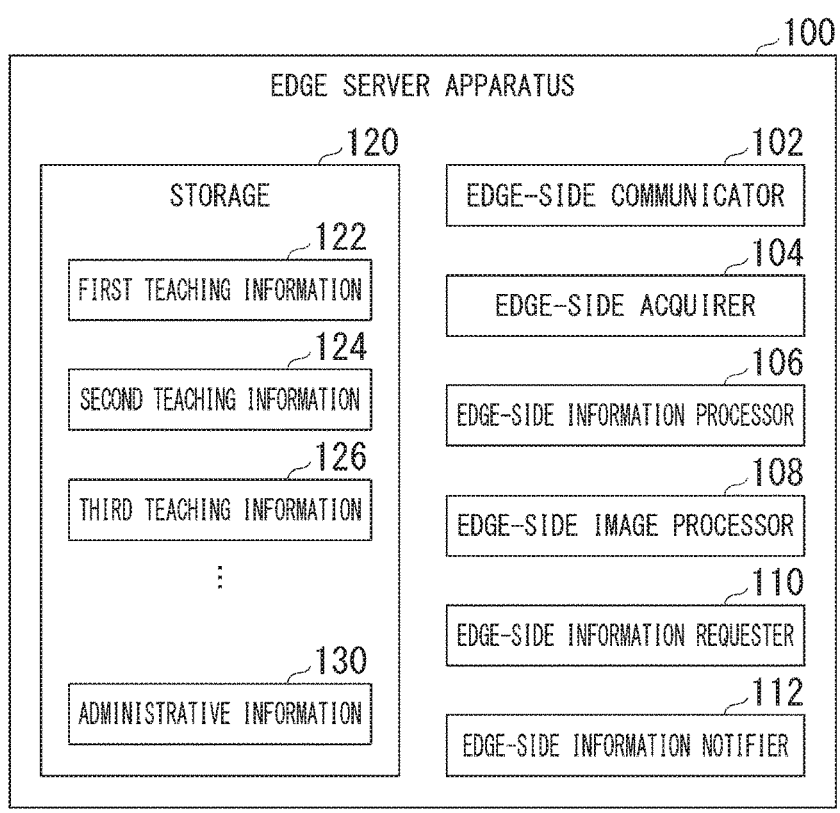
FIG. 3 is a view showing an example of a functional configuration of an edge server apparatus.

FIG. 3 is a view showing an example of a functional configuration of the edge server apparatus 100. For example, the edge server apparatus 100 includes an edge-side communicator 102, an edge-side acquirer 104, an edge-side information processor 106, an edge-side image processor 108, an edge-side information requester 110, an edge-side information notifier 112, and a storage 120.

The edge-side acquirer 104, the edge-side information processor 106, the edge-side image processor 108, the edge-side information requester 110, and the edge-side information notifier 112 are executed by a hardware processor such as a CPU executing a program (software). Some or all of these constituent elements may be executed by hardware (a circuit) such as an LSI, an ASIC, an FPGA, or a GPU or may be executed by software and hardware in cooperation. The program may be stored in a storage device (non-transitory storage medium) such as an HDD or a flash memory in advance or may be stored in a detachable storage medium (non-transitory storage medium) such as a DVD or a CD-ROM such that the program is installed in a case where the storage medium is mounted in a drive device.

For example, the storage 120 is realized by an HDD, a flash memory, an EEPROM, a ROM, a RAM, or the like.

The edge-side communicator 102 is a communication unit which communicates with the robot apparatus 200 by performing radio communication or communicates with the center server apparatus 10 via the network NW.

The edge-side acquirer 104 acquires information obtained by the edge-side communicator 102 through communication with the robot apparatus 200 or the center server apparatus 10.

The edge-side information processor 106 manages information acquired and generated by the edge server apparatus 100.

The edge-side image processor 108 performs predetermined processing on an image captured by an image capturer 202.

When work which the edge-side information requester 110 and the robot apparatus 200 cannot cope with occurs, the center server apparatus 10 or different robot apparatuses 200 are requested to provide information to be used for coping with the work (information to be used for performing the work).

In a case where the robot apparatus 200 learns the guide to the predetermined work, the edge-side information notifier 112 notifies the center server apparatus 10 or different robot apparatuses 200 of information indicating that the robot apparatus 200 has learned the guide to the predetermined work.

For example, the storage 120 stores information (for example, first teaching information 122, second teaching information 124, and third teaching information 126) provided by the robot apparatus 200, and administrative information 130 (which will be described below in detail).

[Robot Apparatus]

Figure 4:
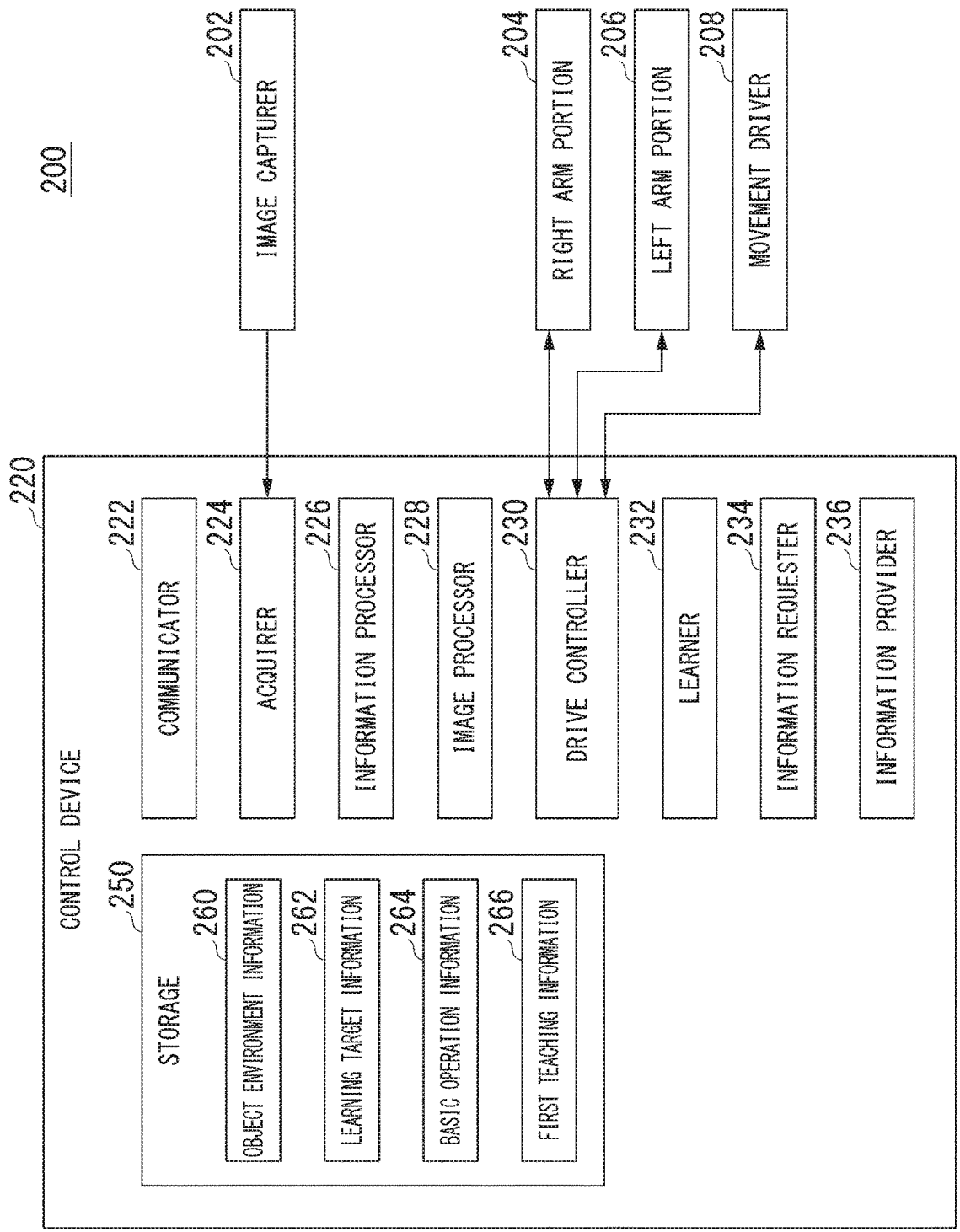
FIG. 4 is a view showing an example of a functional configuration of a robot apparatus.

FIG. 4 is a view showing an example of a functional configuration of the robot apparatus 200. For example, the robot apparatus 200 includes the image capturer 202, a right arm portion 204, a left arm portion 206, a movement driver 208, a control device 220, and a storage 250.

For example, the image capturer 202 is a digital camera utilizing a solid-state image capturing element such as a charge coupled device (CCD) or a complementary metal oxide semiconductor (CMOS). For example, the image capturer 202 captures an image of a surrounding area of the robot apparatus 200 at a predetermined timing. The number of image capturers 202 is not limited to one, and a plurality of image capturers 202 may be provided in the robot apparatus 200.

For example, the right arm portion 204 is an arm of an articulated robot of which a first end portion is connected to a part near the right side of the robot apparatus. For example, the left arm portion 206 is another arm of the articulated robot of which a first end portion is connected to a part near the left side of the robot apparatus. Hereinafter, in a case where the right arm portion 204 and the left arm portion 206 are not distinguished from each other, an arm portion will be simply referred to as "an arm portion". A second end portion of the arm portion is configured to be able to grasp a predetermined object. The arm portion is driven based on control of the control device 220. The arm portion can perform a movement equivalent to a movement of an arm of a person.

The movement driver 208 is a driver for moving the robot apparatus 200 on a floor surface or the ground. For example, the movement driver 208 may be two legs or may be tires or rollers. For example, in a case where the movement driver 208 is constituted of legs, the legs operate such that the robot apparatus 200 walks based on control of the control device 220. Accordingly, the robot apparatus 200 can move in a desired direction.

For example, the control device 220 includes a communicator 222, an acquirer 224, an information processor 226, an image processor 228, a drive controller 230, a learner 232, and an information requester 234. For example, the acquirer 224, the information processor 226, the image processor 228, the drive controller 230, the learner 232, and the information requester 234 are executed by a hardware processor such as a CPU executing a program (software). Some or all of these constituent elements may be executed by hardware (a circuit) such as an LSI, an ASIC, an FPGA, or a GPU or may be executed by software and hardware in cooperation. The program may be stored in a storage device (non-transitory storage medium) such as an HDD or a flash memory in advance or may be stored in a detachable storage medium (non-transitory storage medium) such as a DVD or a CD-ROM such that the program is installed in a case where the storage medium is mounted in a drive device.

For example, the storage 250 is realized by an HDD, a flash memory, an EEPROM, a ROM, a RAM, or the like.

For example, the communicator 222 is a communication unit which communicates with different robot apparatuses 200 or different edge server apparatuses 100 by performing radio communication.

The acquirer 224 acquires the second teaching information which serves as a guide to second work operation similar to first work operation or second work operation related to the first work operation from different apparatuses (the robot apparatuses 200, the edge server apparatuses 100, or the center server apparatus 10) having the second teaching information.

The information processor 226 manages information acquired and generated by the robot apparatus 200.

The image processor 228 performs predetermined image processing on an image captured by the image capturer 202. For example, the image processor 228 determines whether or not an image captured by the image capturer 202 is similar to other images. Processing of the image processor 228 and other functional portions will be described below in detail.

The drive controller 230 performs the first work operation based on the first teaching information stored in the storage 250 and performs the second work operation based on the second teaching information acquired by the acquirer 224.

The learner 232 learns the guide to the predetermined work.

In a case where work which a host apparatus cannot cope with occurs, the information requester 234 requests different apparatuses to provide information to be used for coping with the work.

In a case where the learner 232 learns the guide to the predetermined work, an information provider 236 notifies different apparatuses of information indicating that learner 232 has learned the guide to the predetermined work.

For example, the storage 250 stores object environment information 260, learning target information 262, basic operation information 264, and first teaching information 266. The information will be described below in detail.

Some or all of the processing of the robot apparatus 200, the edge server apparatus 100, and the center server apparatus 10 described above may be executed by an artificial intelligence (AI) technology. In the functional portions included in the robot apparatus 200, the edge server apparatus 100, and the center server apparatus 10 or information stored in the storages, some or all of the functional portions or the information may be included in different apparatuses.

[Operation of Robot Apparatus]

As will be described below, the robot apparatus 200 generates the first teaching information 266. As an example, a case where the robot apparatus 200 learns work of performing soldering will be described.

[Acquisition of Image]

Figure 5:
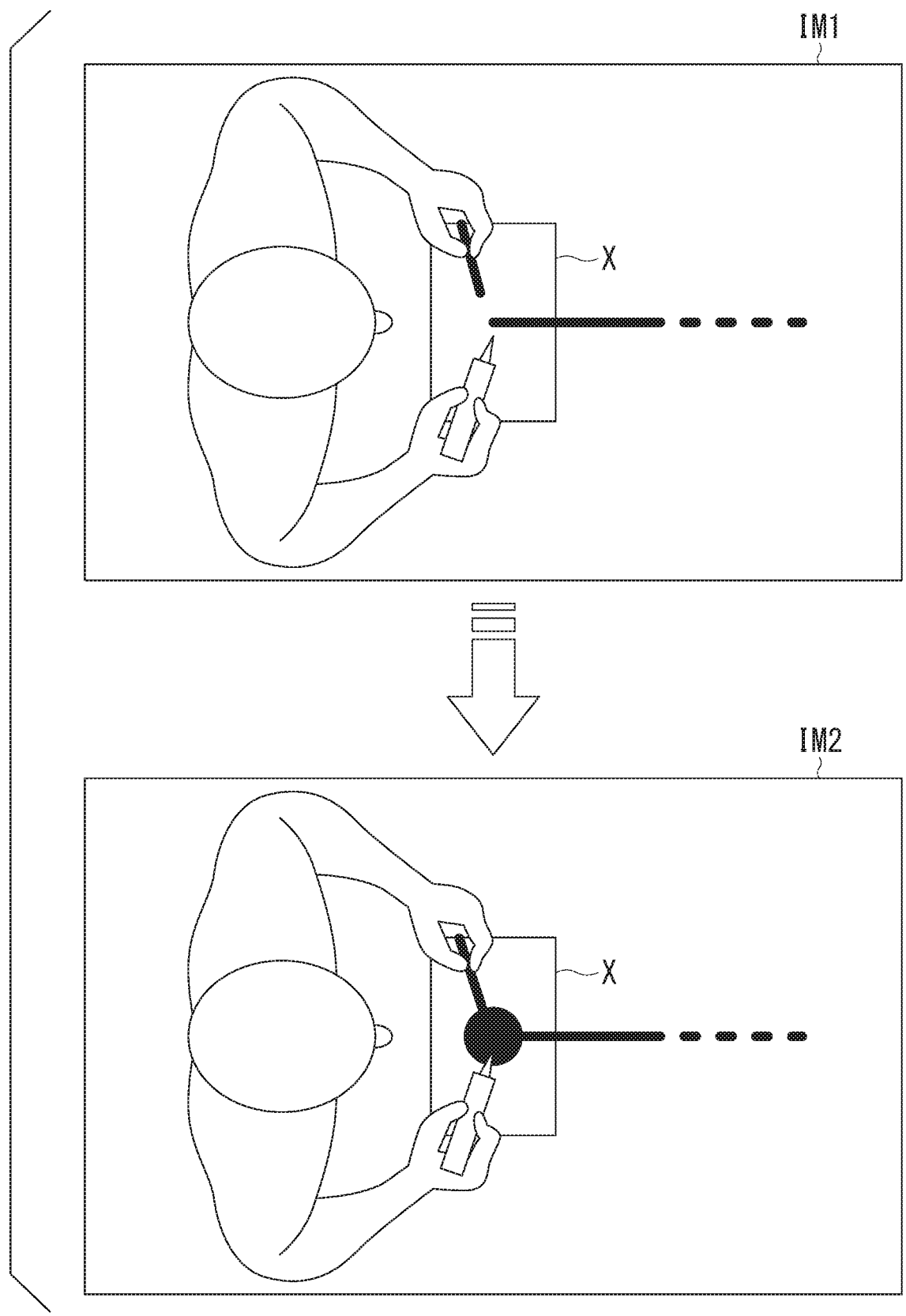
FIG. 5 is a view showing an example of a captured work image of a situation in which a person performs soldering.

FIG. 5 is a view showing an example of a captured work image of a situation in which a person performs soldering. The robot apparatus 200 acquires a work image from the center server apparatus 10 or different apparatuses, or acquires a work image from the storage medium connected to the host apparatus. The robot apparatus 200 learns work based on an acquired image.

First, the image processor 228 of the robot apparatus 200 recognizes the environment, objects, and the like included in a work image using a technique such as pattern matching. For example, the image processor 228 recognizes the environment, objects, and the like included in a work image with reference to the object environment information 260. For example, the object environment information 260 includes a feature quantity extracted from an image in which a predetermined environment or object is captured. The feature quantity denotes information based on the luminance for each pixel or each pixel group in an image.

For example, in a work image (IM1) on the upper side in FIG. 5, the image processor 228 recognizes that a person holds a soldering iron with his/her right hand at first coordinates (for example, X1, Y1, and Z1) and holds a solder with his/her left hand at second coordinates. In a work image (IM2) on the lower side in FIG. 5, the image processor 228 recognizes that the person has moved the soldering iron to third coordinates and has moved the solder to fourth coordinates.

Thereafter, in a work image (not shown), the image processor 228 recognizes that a tip of the soldering iron and a tip of the solder are brought into contact with each other and the solder is welded at a predetermined position on a component X. In a case where state at the predetermined position on the component X becomes a predetermined state (for example, a state where a solder is appropriately applied), the image processor 228 recognizes that work for the component has ended.

For example, the image processor 228 recognizes the environment, the object, the state of the object, and the like (which will hereinafter be referred to as a surrounding environment) in the first work operation image, and the surrounding environment in the second work operation image captured at a timing after the first work operation image. The first work operation image and the second work operation image are images included in the learning target information 262 used when learning a skill related to work.

[Learning Technique 1 for Skill]

Figure 6:
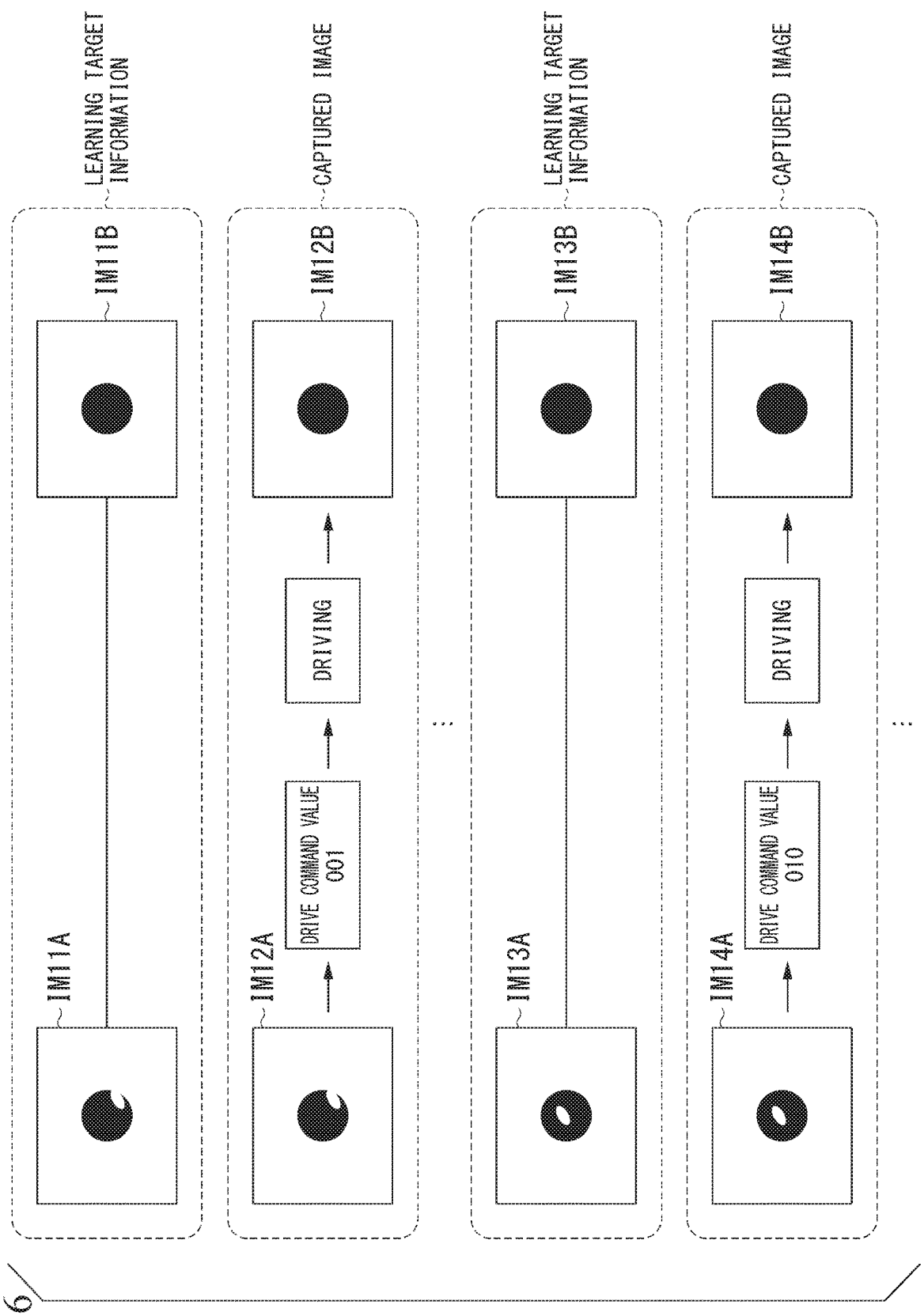
FIG. 6 is a view for describing learning of work based on a first work operation image and a second work operation image.

FIG. 6 is a view for describing learning of work based on the first work operation image and the second work operation image. The robot apparatus 200 learns a skill related to work using the first work operation image, the second work operation image, and an image actually captured by the image capturer 202. Images IM11A, IM11B, IM13A, and IM13B in FIG. 6 are images included in the learning target information 262, and images IM12A, IM12B, IM14A, and IM14B in FIG. 6 are images captured by the image capturer 202.

For example, as shown in the upper diagram of FIG. 6, the robot apparatus 200 identifies the image IM11A similar to the image IM12A in a scenario in which the pre-driving image IM12A before the arm portion is driven is acquired, and searches for a drive command value for controlling driving of the arm portion to perform soldering as in the image IM11B associated with the identified image IM11A. The robot apparatus 200 acquires a driving force command value for driving the arm portion in a scenario in which the image IM12A is acquired, based on the search result.

Accordingly, for example, in a case where the image IM12A is acquired, the robot apparatus 200 drives the arm portion such that a solder can be applied to a region which is insufficiently soldered. The image IM12B is an image of a state where a solder is applied using the arm portion. In this manner, the robot apparatus 200 learns work of soldering in a predetermined scenario.

Similarly, for example, as shown in the lower diagram of FIG. 6, the robot apparatus 200 identifies the image IM13A similar to the image IM14A in a scenario in which the pre-driving image IM14A before the arm portion is driven is acquired, and searches for a drive command value for controlling driving of the arm portion to perform soldering as in the image IM13B associated with the identified image IM13A. The robot apparatus 200 acquires a driving force command value for driving the arm portion in a scenario in which the image IM14A is acquired, based on the search result.

[Flowchart]

Figure 7:
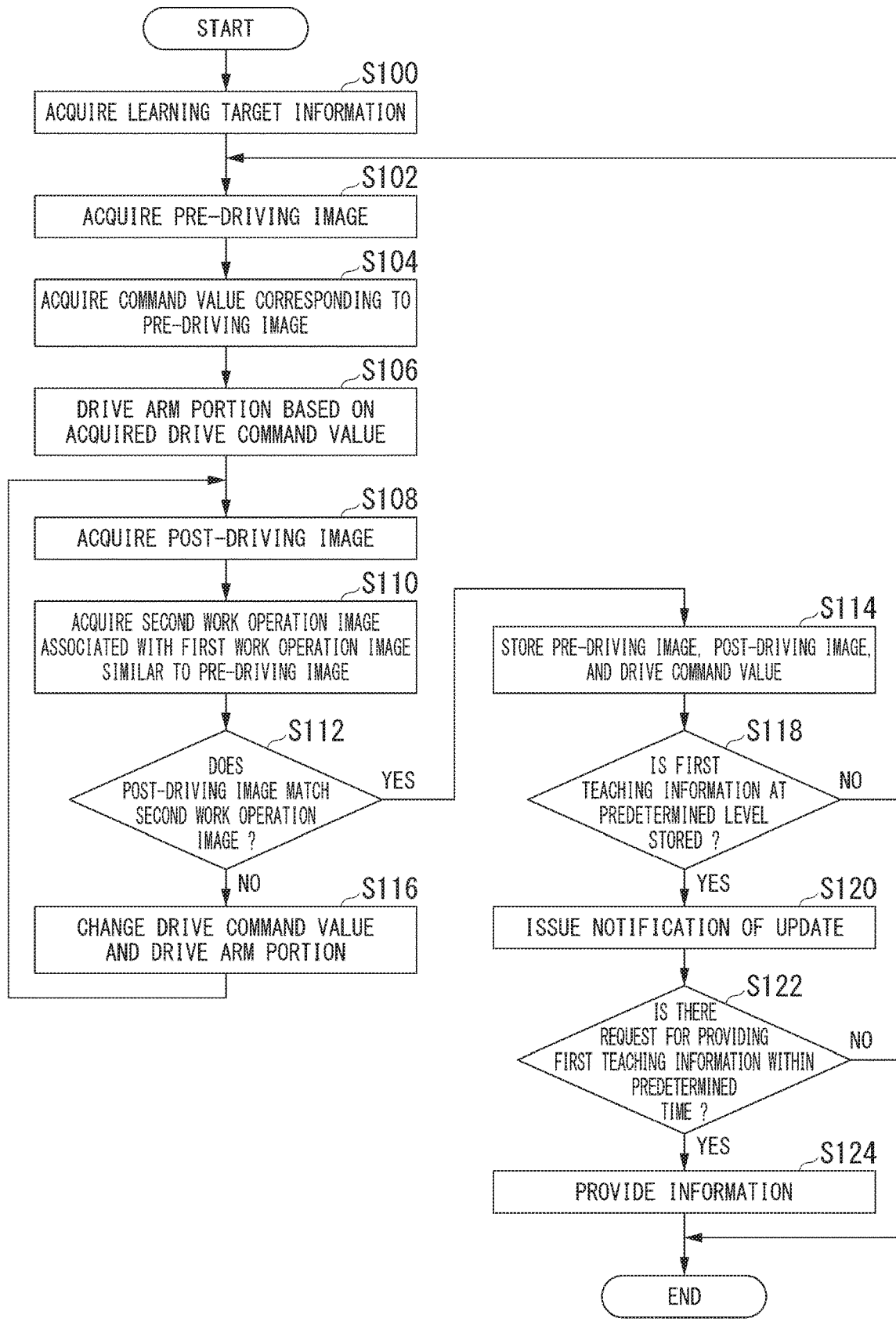
FIG. 7 is a flowchart showing a flow of processing executed by the robot apparatus.

FIG. 7 is a flowchart showing a flow of processing executed by the robot apparatus 200. First, the information processor 226 acquires the learning target information 262

(Step S100). That is, the information processor 226 acquires a plurality of combinations of the first work operation image and the second work operation image.

Next, the image processor 228 acquires an image captured by the image capturer 202 (which will hereinafter be referred to as a pre-driving image) (Step S102). Next, with reference to the basic operation information 264, the image processor 228 acquires a drive command value (command value corresponding to the pre-driving image) associated with a pattern into which the acquired pre-driving image is classified (Step S104).

In the basic operation information 264, patterns 1 to N ("N" is an arbitrary natural number) in which a plurality of images are classified into predetermined patterns and drive command values 1 to n ("n" is an arbitrary natural number) for operating the arm portion associated respectively with the patterns 1 to N are associated with each other. For example, in a case where it is determined that an image corresponds to the pattern 1, the drive controller 230 drives the arm portion based on the drive command value 1 associated with the pattern 1. The basic operation information 264 may be information which has been learned based on a learning technique 1 or any technique of learning techniques 2 to 4 which will be described below or may be information which has been acquired in advance.

Next, the drive controller 230 drives the arm portion based on the acquired drive command value (Step S106). Next, the image processor 228 acquires a post-driving image captured by the image capturer 202 (Step S108). Next, the image processor 228 acquires the first work operation image similar to the pre-driving image and acquires the second work operation image associated with the first work operation image (Step S110). Next, the image processor 228 determines whether or not a drive image of Step S108 matches the second work operation image of Step S110 (Step S112).

In a case where the drive image of Step S108 matches the second work operation image of Step S110, the learner 232 causes the first teaching information 266 in which the pre-driving image, the post-driving image, and the drive command value are associated with each other to be stored in the storage 250 (Step S114).

In a case where the drive image does not match the second work operation image in Step S112, the drive controller 230 changes the drive command value based on a predetermined reference and drives the arm portion (Step S116). Before the arm portion is driven in Step S116, an environment similar to that before the processing of Step S106 (state of a soldering target object) is set to be reproduced. Thereafter, the procedure returns to the processing of Step S108.

In a case where the drive image of Step S108 does not match the second work operation image of Step S110 in Step S112, the processing of Step S102 may be performed. Accordingly, the arm portion is driven in the processing of Step S106, and processing as described above is performed with respect to an object after the object has changed.

After the processing of Step S114, the information processor 226 determines whether or not the first teaching information 266 at a predetermined level is stored in the storage 250 (Step S118). For example, a predetermined level denotes that there are a predetermined number of combinations of the pre-driving image, the post-driving image, and the drive command value.

In a case where the first teaching information 266 at a predetermined level is not stored in the storage 250, the procedure proceeds to the processing of Step S102. In a case where the first teaching information 266 at a predetermined level is stored in the storage 250, the information provider 236 notifies different robot apparatuses 200 or the edge server apparatus 100 of the fact that teaching information has been updated (Step S120).

Next, the information provider 236 determines whether or not a request for providing the first teaching information is transmitted from a different robot apparatus 200 within a predetermined time (Step S122). In a case where a request for providing the first teaching information 266 is transmitted from a different robot apparatus 200 within a predetermined time, the information provider 236 transmits the first teaching information 266 to the request source (Step S124). Accordingly, one routine of the present flowchart ends.

As described above, the robot apparatus 200 can learn a new skill. The robot apparatus 200 can provide a newly learned skill to different apparatuses. In this manner, the capability of the robot apparatus 200 can be improved more simply. The robot apparatus 200 can autonomously perform work using the learned skill. In the foregoing example, learning of a skill related to soldering has been described. However, the embodiment is not limited to the foregoing example. For example, the foregoing example may be applied to learning of a skill related to wiring or assembly, learning of a technique for knowledge instruction, and learning of other skills.

Learning of a skill related to work may be set as follows.

[Learning Technique 2 for Skill]

Figures 8, 9:
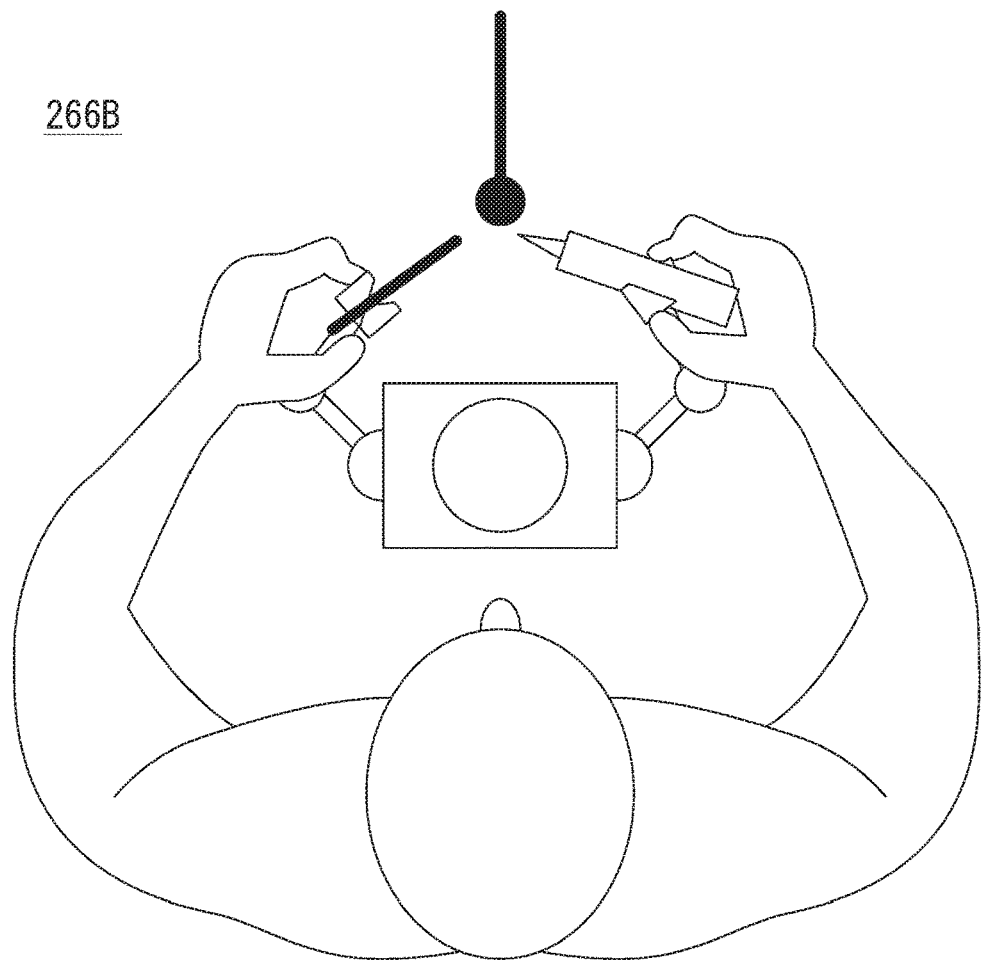
FIG. 8 is a view showing an example of details of first teaching information.
FIG. 9 is a view showing an example of a scenario in which the first teaching information is generated.

For example, the robot apparatus 200 may learn a skill related to work by acquiring the first teaching information 266A in which the surrounding environment and a scenario of the drive command value are associated with each other. FIG. 8 is a view showing an example of details of the first teaching information 266A. The first teaching information 266A is information in which an image showing the surrounding environment and the scenario of the drive command value corresponding to the operation of the arm portion in the surrounding environment are associated with each other. For example, the robot apparatus 200 identifies the image IM11A similar to the image IM12A associated with the first teaching information 266A in the surrounding environment corresponding to the image IM12A in FIG. 6 described above, for example. The robot apparatus 200 operates in accordance with the scenario of the drive command value associated with the identified image, and therefore soldering can be completed.

[Learning Technique 3 for Skill]

For example, in the robot apparatus 200, information (teaching information based on direct teaching) in which an operation performed by a person with respect to the arm portion and an image of the surrounding environment captured at that time are associated with each other may be stored in the storage 250 as first teaching information 266B.

FIG. 9 is a view showing an example of a scenario in which the first teaching information 266B is generated. For example, a person provides a guide to an optimal operation of the arm portion for the surrounding environment at that time. The learner 232 causes information to be stored in the storage 250 as the first teaching information 266B. The stored information is a force applied to the arm portion when guided and the drive command value based on the direction thereof are associated with an image including the surrounding environment when guided. Accordingly, the robot apparatus 200 can acquire the drive command value in a predetermined surrounding environment based on the first teaching information 266B.

Instead of providing a guide by applying a force to the arm portion, a person may generate the first teaching information 266B by instructing the robot apparatus 200 by voice. In this case, the storage 250 of the robot apparatus 200 stores relevant information in which a voice and an operation of the arm portion are associated with each other. In a case where a voice of a person is input to a microphone, the robot apparatus 200 converts the input voice into a drive command value for the arm portion with reference to relevant information and drives the arm portion based on the converted drive command value. The robot apparatus 200 learns a relationship between the surrounding environment and the drive command value in the surrounding environment.

[Learning Technique 4 for Skill]

Figure 10:
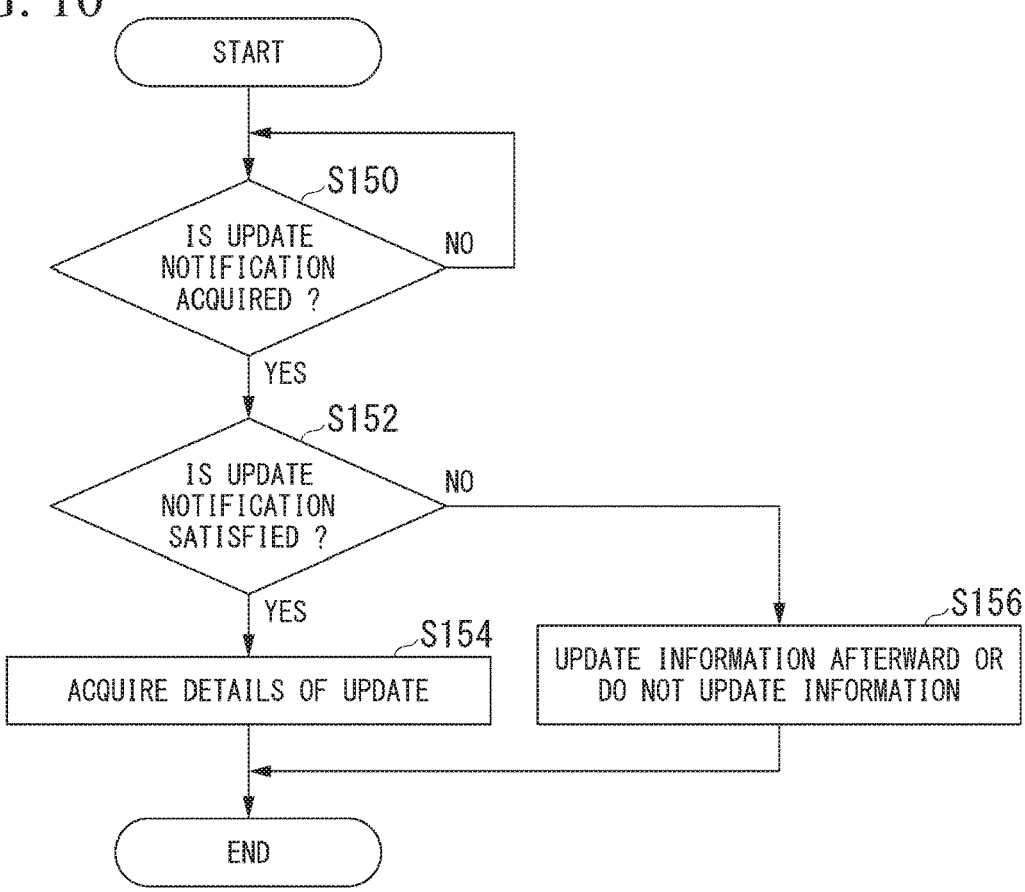
FIG. 10 is a flowchart showing an example of a flow of processing in which the robot apparatus learns a skill.

The robot apparatus 200 may learn a new skill based on information acquired by different robot apparatuses 200 or the edge server apparatus 100. FIG. 10 is a flowchart showing an example of a flow of processing in which the robot apparatus 200 learns a skill.

First, the information processor 226 determines whether or not an update notification is acquired from a different robot apparatus 200 (Step S150). In a case where an update notification is acquired, the information processor 226 determines whether or not update conditions are satisfied (Step S152). Update conditions denote that an estimated time for an update can be ensured (for example, work can be halted during an estimated time for an update), it is estimated that a skill related to an update will be necessary, and the like.

For example, the information processor 226 acquires the kind and identification information of the skill included in the update notification and compares the acquired kind and identification information with the kind and identification information stored in the storage 250 of the host apparatus. In a case where these are similar or related to each other, it is determined that a skill related to an update is necessary. For example, being similar or related to each other denotes that the types of work to be performed are the same as each other or they are highly relevant to each other (for example, being related to each other in manufacturing of a predetermined product) although the types of the work differ from each other.

In a case where the update conditions are satisfied, the information requester 234 requests transmission of information for improving the updated skill and acquires the requested information from the update notification source (Step S154). For example, information for improving the skill denotes a combination of the first work operation image, the second work operation image, and the drive command value. This drive command value is a command value for driving the arm portion to cause the robot apparatus 200 to perform work such that the state of the surrounding environment included in the second work operation image is realized when the first work operation image is acquired. In a case where the update conditions are not satisfied, the information requester 234 does not request transmission of information for improving the updated skill (Step S156). In this case, the information requester 234 may acquire information for improving the skill afterward from the update notification source. Accordingly, processing of one routine of the present flowchart ends.

For example, the robot apparatus 200 causes the teaching information based on direct teaching to be stored in the storage 250 as basic operation information (reference information) and performs work based on this reference information. The update notification denotes a notification indicating that the teaching information based on direct teaching has been updated in a different robot apparatus 200. In a case where the robot apparatus 200 acquires an update notification indicating that the teaching information based on direct teaching has been updated, acquires the teaching information based on direct teaching related to the acquired update notification from different robot apparatuses 200 or the edge server apparatus 100. The robot apparatus 200 updates the teaching information based on the acquired teaching information. The updated teaching information includes additional information. The acquired teaching information based on direct teaching is additional information with respect to the reference information.

According to the processing described above, the robot apparatus 200 can learn a new skill based on various methods. As a result, capability of the robot apparatus 200 can be improved more simply.

[Processing Performed by Administrator]

Figure 11:
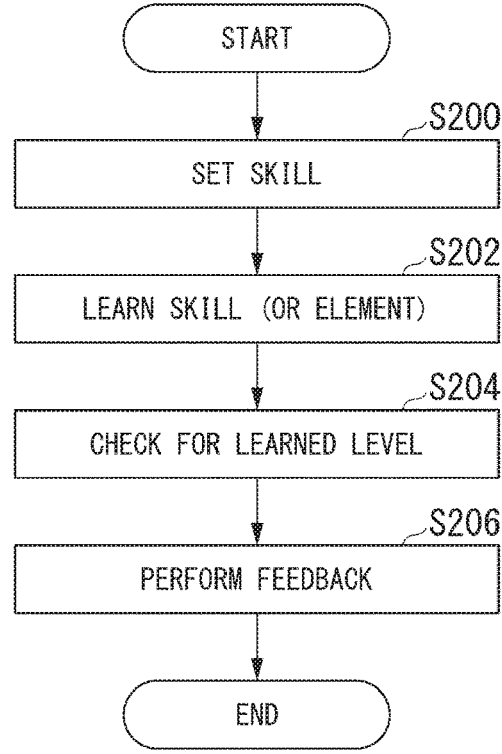
FIG. 11 is a flowchart showing an example of a flow of processing performed by an administrator.

An administrator of the robot apparatus 200 may further ameliorate a skill by causing the robot apparatus 200 to learn the skill (or the work) and checking for the learned level thereafter. FIG. 11 is a flowchart showing an example of a flow of processing performed by an administrator. First, the administrator sets a skill (or a task) to learn by the robot apparatus 200 (Step S200). Next, the administrator instructs the robot apparatus 200 to learn the set skill (or elements included in the skill) (Step S202). Next, the administrator checks for the learned level of the learned skill (Step S204). For example, the administrator checks for the learned level based on the result of the work performed by the robot apparatus 200.

Next, the administrator performs feedback related to the work based on the checking result of the learned level (Step S206). For example, feedback denotes that an unlearned situation (environment insufficient to cope with) is extracted and an operation in the extracted situation is learned. For example, in the case of FIG. 6 described above, soldering can be performed well in the surrounding environment of the image IM12A, but in a case where soldering cannot be performed well in the surrounding environment of the image IM14A, the administrator causes the robot apparatus 200 to learn an operation of the arm portion in the surrounding environment of the image IM14A.

[Processing in a Case where Surrounding Environment which Robot Apparatus Cannot Cope with Occurs]

Figure 12:
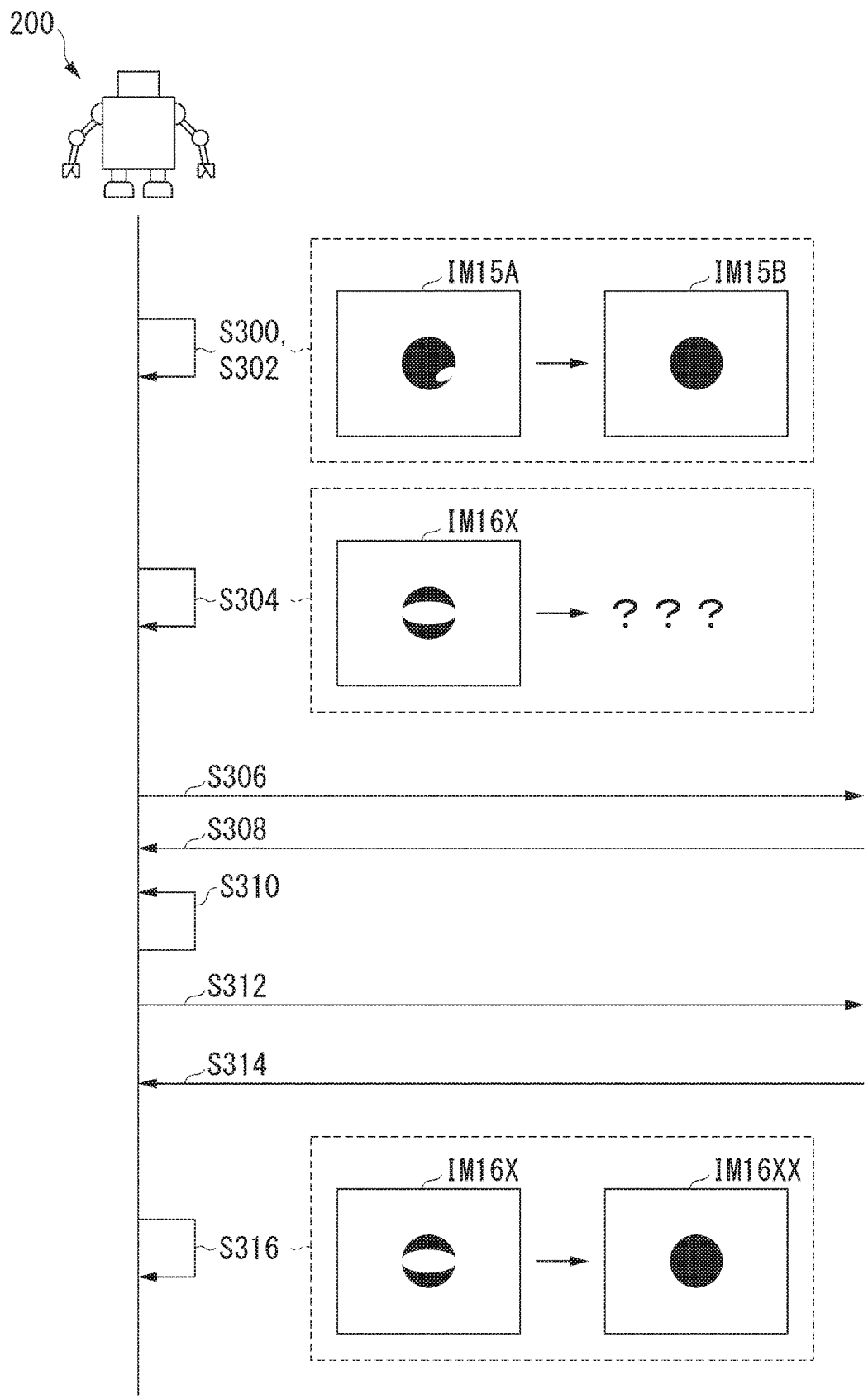
FIG. 12 is a flowchart showing an example of a flow of processing executed when a surrounding environment which the robot apparatus cannot cope with occurs.

FIG. 12 is a flowchart showing an example of a flow of processing executed in a case where a surrounding environment which the robot apparatus 200 cannot cope with occurs. Hereinafter, an example of processing in which the robot apparatus 200 performs work (for example, soldering) will be described.

First, the image processor 228 of the robot apparatus 200 acquires an image IM15A and identifies an image similar to the image IM15A in the first teaching information 266 (Step S300). Next, the drive controller 230 acquires a driving force command value associated with the identification image identified with reference to the first teaching information 266 and drives the arm portion based on the acquired driving force command value (Step S302). Accordingly, work is performed, and a result as in an image IM15B is achieved.

Next, the image processor 228 acquires an image IM16X and attempts to identify an identification image similar to the image IM16X in the first teaching information 266 (Step S304). However, it is assumed that the image processor 228 cannot identify an image similar to the image IM16X. That is, it is assumed that the robot apparatus 200 has not learned an operation in a surrounding environment related to the image IM16X. In this case, since the robot apparatus 200 cannot cope with the surrounding environment, the information requester 234 requests different apparatuses to provide information related to the operation (information for improving the skill), such as a drive command value for coping with the surrounding environment related to the image IM16X.

First, the information requester 234 inquires of different robot apparatuses 200 whether or not information for coping with the surrounding environment of the image IM16X (information related to improvement of the skill) is retained (Step S306). Next, the information requester 234 acquires an inquiry result from a different robot apparatus 200 (Step S308). Next, based on the inquiry result, the information requester 234 determines whether or not the different robot apparatus 200 retains information for coping with the surrounding environment of the image IM16X (Step S310).

In a case where it is determined that information for coping with the surrounding environment of the image IM16X is not retained, the information requester 234 inquires of the edge server apparatus 100 whether or not information for coping with the surrounding environment of the image IM16X is retained (Step S312). Next, the information requester 234 acquires an inquiry result from the edge server apparatus 100 (Step S314). Here, it is assumed that the information requester 234 acquires information for coping with the surrounding environment of the image IM16X. For example, acquired information for coping with the surrounding environment of the image IM16X denotes a drive command value for operating the arm portion in the surrounding environment of an image IM11X or a scenario of the drive command value. Next, the drive controller 230 drives the arm portion based on the information for coping with the surrounding environment of the image IM16X (Step S316). Accordingly, work is performed, and the work is completed as shown in an image IM16XX.

For example, in the robot apparatus 200, it is assumed that teaching information based on direct teaching is stored in the storage 250 as the basic operation information (reference information). In a case where the robot apparatus 200 performs work based on this reference information, if an event which the robot apparatus 200 cannot cope with occurs, an inquiry is made to different robot apparatuses 200 or the edge server apparatus 100 as in the processing of the foregoing flowchart, and teaching information for coping with the event which the robot apparatus 200 cannot cope with is acquired. For example, this teaching information is information acquired by a different robot apparatus 200 based on the direct teaching. The robot apparatus 200 takes the acquired teaching information for coping with the event which the robot apparatus 200 cannot cope with, as additional information with respect to the reference information, and updates the teaching information.

As described above, even in a case where an unlearned skill is necessary, the robot apparatus 200 can acquire information for improving the skill from different apparatuses and can perform an operation corresponding to the surrounding environment based on the acquired information. The robot apparatus 200 may inquire of a nearby person regarding work which it cannot cope with. The robot apparatus 200 may cope with work which it cannot cope with by a linguistic address, a gestural advice, or a guide of a person.

[Information Provided to Improve Skill of Edge Server Apparatus]

Figure 13:
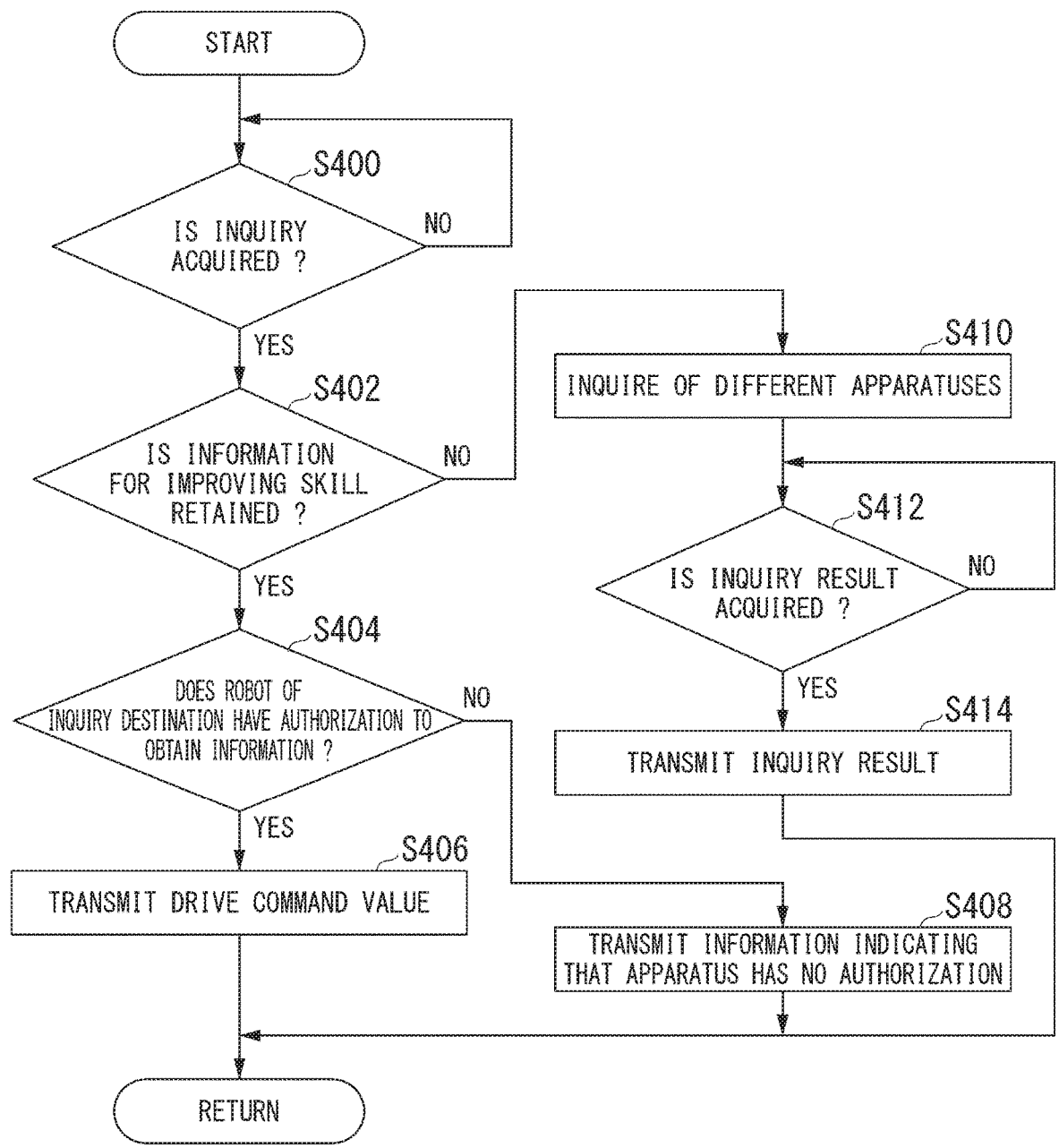
FIG. 13 is a flowchart showing an example of a flow of processing performed when providing information for improving the skill executed by the edge server apparatus.

FIG. 13 is a flowchart showing an example of a flow of processing performed when providing information for improving the skill executed by the edge server apparatus 100. First, it is determined whether or not the edge-side acquirer 104 has acquired an inquiry related to information for improving the skill from the robot apparatus 200 (Step S400).

In a case where an inquiry related to information for improving the skill is acquired from the robot apparatus 200, it is determined whether or not the edge-side information processor 106 retains the inquired information for improving the skill (Step S402). For example, the edge-side information processor 106 acquires an image of the surrounding environment which it intends to cope with from the robot apparatus 200, and identification information of the robot apparatus 200. With reference to the administrative information 130, it is determined whether or not the edge-side image processor 108 can identify an image similar to the image of the surrounding environment acquired from the robot apparatus 200. In a case where it is determined that an image similar to the image of the surrounding environment acquired from the robot apparatus 200 can be identified, the edge-side information processor 106 determines that the inquired information for improving the skill is retained.

FIG. 14 is a view showing an example of details of the administrative information 130. For example, the administrative information 130 is information in which an image of the surrounding environment, a drive command value, and a disclosure range are associated with each other. Examples of the disclosure range include an unlimited disclosure range and a disclosure range allowed for apparatuses with an authorization A.

In a case where it is determined in Step S402 that information for improving the skill is retained, the edge-side information processor 106 determines with reference to the administrative information 130 whether or not a robot apparatus 200 of the inquiry destination has an authorization to obtain the information for improving the skill (Step S404). The edge-side information processor 106 identifies the drive command value and the disclosure range associated with the image of the surrounding environment in the administrative information 130 identified by the edge-side image processor 108. With reference to authorization information (not shown), the edge-side information processor 106 determines whether or not the robot apparatus 200 which has made an inquiry is a disclosure target of the information for improving the skill. Authorization information denotes information in which identification information of the robot apparatus 200 and an authorization are associated with each other.

In a case where it is determined that the robot apparatus 200 which has made an inquiry has an authorization for disclosure of the information for improving the skill (in a case where it is determined that the information is not secret information), the edge-side information processor 106 transmits a drive command value corresponding to the inquiry to the robot apparatus 200 (Step S406).

In a case where it is determined that the robot apparatus 200 which has made an inquiry does not have an authorization for disclosure of the information for improving the skill, the edge-side information processor 106 transmits information indicating that the robot apparatus 200 does not have an authorization to acquire the information for improving the skill to the robot apparatus 200 (Step S408).

In a case where it is determined in Step S402 that the inquired information for improving the skill is not retained, the edge-side information requester 110 inquires of different apparatuses (different edge server apparatuses 100 or the center server apparatus 10) whether or not the information for improving the skill inquired from the robot apparatus 200 is retained (Step S410). The edge-side information requester 110 determines whether or not an inquiry result is acquired (Step S412).

In a case where an inquiry result is acquired, the edge-side information notifier 112 transmits the inquiry result to the robot apparatus 200 (Step S414). For example, in a case where information for improving the skill is acquired, this information is transmitted to the robot apparatus 200, and in a case where information for improving the skill is not acquired, the fact that information for improving the skill is not acquired is transmitted to the robot apparatus 200. Accordingly, processing of one routine of the present flowchart ends.

According to the processing described above, the edge server apparatus 100 inquires of the center server apparatus 10 whether or not it has information for improving the skill. In a case where the center server apparatus 10 has the information, the edge server apparatus 100 transmits the information acquired from the center server apparatus 10 to the robot apparatus 200. Accordingly, capability of the robot apparatus 200 can be improved more simply.

[Information Provided to Improve Skill of Center Server Apparatus]

Figure 15:
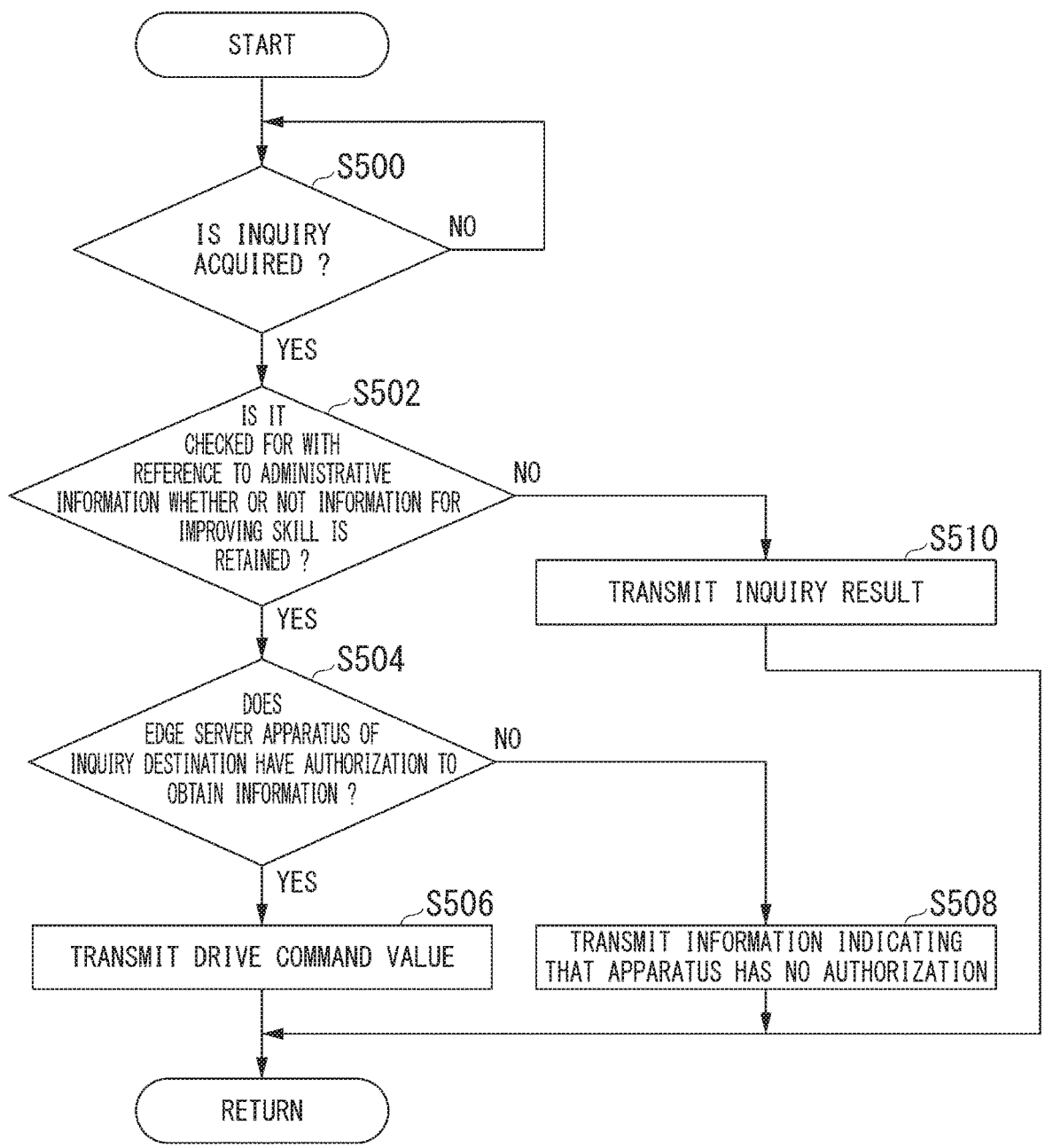
FIG. 15 is a flowchart showing an example of a flow of processing performed when providing information for improving the skill executed by the center server apparatus.

FIG. 15 is a flowchart showing an example of a flow of processing performed when providing information for improving the skill executed by the center server apparatus 10. First, it is determined whether or not the center-side acquirer 14 has acquired an inquiry related to information for improving the skill from the edge server apparatus 100 (Step S500).

In a case where an inquiry related to information for improving the skill is acquired from the edge server apparatus 100, it is determined whether or not the center-side information processor 16 retains the inquired information for improving the skill (Step S502). For example, the center-side information processor 16 acquires an image of the surrounding environment which it intends to cope with from the edge server apparatus 100, and identification information of the edge server apparatus 100 (or the robot apparatus 200 which has made an inquiry). With reference to the administrative information 40, it is determined whether or not the center-side image processor 18 can identify an image similar to the image of the surrounding environment acquired from the edge server apparatus 100. For example, the administrative information 40 is information in which an image of the surrounding environment, a drive command value, and a disclosure range are associated with each other. The disclosure range is set for each of the identification information of the edge server apparatus 100 and the identification information of the robot apparatus 200.

In a case where it is determined that an image similar to the image of the surrounding environment acquired from the edge server apparatus 100 can be identified, the center-side information processor 16 determines that the inquired information for improving the skill is retained. With reference to the administrative information 40, the edge-side information processor 106 determines in Step S504 whether or not the edge server apparatus 100 of the inquiry destination (or the robot apparatus 200 which has made an inquiry) has an authorization to obtain information for improving the skill (Step S504).

The center-side information processor 16 identifies the drive command value and the disclosure range associated with the image of the surrounding environment in the administrative information 40 identified by the center-side image processor 18. With reference to authorization information (not shown), the center-side information processor 16 determines whether or not the edge server apparatus 100 which has made an inquiry (or the robot apparatus 200 which has made an inquiry) is a disclosure target of the information for improving the skill. Authorization information denotes information in which identification information of the center server apparatus 10 (or the robot apparatus 200) and an authorization are associated with each other.

In a case where it is determined that the edge server apparatus 100 (or the robot apparatus 200) which has made an inquiry has an authorization for disclosure of the information for improving the skill, the center-side information processor 16 transmits a drive command value corresponding to the inquiry to the edge server apparatus 100 (Step S506).

In a case where it is determined that the edge server apparatus 100 (or the robot apparatus 200) which has made an inquiry does not have an authorization for disclosure of the information for improving the skill, the center-side information processor 16 transmits information indicating that the edge server apparatus 100 (or the robot apparatus 200) does not have an authorization to acquire the information for improving the skill to the edge server apparatus 100 (Step S508).

In a case where it is determined that the inquired information for improving the skill is not retained in Step S502, the center-side information processor 16 transmits information indicating that the inquired information for improving the skill is not retained to the edge server apparatus 100 (Step S510). Accordingly, processing of one routine of the present flowchart ends.

According to the processing described above, the robot apparatus 200 can acquire information for improving the skill from the center server apparatus 10, and therefore capability can be improved more simply.

In the foregoing example, the robot apparatus 200 transmits an image to different robot apparatuses 200 or the edge server apparatus 100 and acquires information for improving the skill. However, in place thereof, an inquiry may be made regarding whether different robot apparatuses 200 or the edge server apparatus 100 has information for improving the skill by voice or text. For example, in a case where a product is produced by combining a plurality of components, the robot apparatus 200 makes an inquiry regarding "a way of connecting a component A and a component B to each other" and acquires an inquiry result from a different apparatus. For example, in a case where the robot apparatus 200 obtains a replay, such as "an A-connector of the component A and a B-connector of the component B are connected to each other, and so on", the robot apparatus 200 interprets the meaning of the replay and performs work.

In the present embodiment, in a case where work which the robot apparatus 200 cannot cope with occurs, the robot apparatus 200 inquires of different apparatuses regarding a coping method. For example, the robot apparatuses 200 can share the information related to the skill retained by the robot apparatuses 200 or the edge server apparatuses 100, but (1) it may result in improvident leakage of secret information or (2) it may result in increase in storage capacity of the robot apparatus 200.

In contrast, in the present embodiment, in a case where the robot apparatus 200 does not share all the information and encounters a surrounding environment which it cannot cope with, the coping method is checked for. Accordingly, improvident leakage of secret information can be prevented and increase in storage capacity can be curbed as well. However, in the present embodiment, information of the robot apparatuses 200 which belong to the same facility, the same office, or the same work place may be shared. In this case, application efficiency in work performed by the host apparatus can be improved while improvident leakage of secret information is prevented and increase in storage capacity is curbed as well.

According to the first embodiment described above, the robot apparatus 200 acquires the second teaching information (the second instructional information) which serves as a guide to the second work operation similar to the first work operation or the second work operation related to the first work operation from different apparatuses having the second teaching information. The robot apparatus 200 performs the first work operation based on the first teaching information (the first instructional information) stored in the storage 250 and performs the second work operation based on the acquired second teaching information. Accordingly, capability of the robot apparatus 200 can be improved more simply.

Second Embodiment

Hereinafter, a second embodiment will be described. In the second embodiment, the robot apparatus 200 teaches work to a person. Hereinafter, differences between the first embodiment and the present embodiment will be mainly described.

Figure 16:
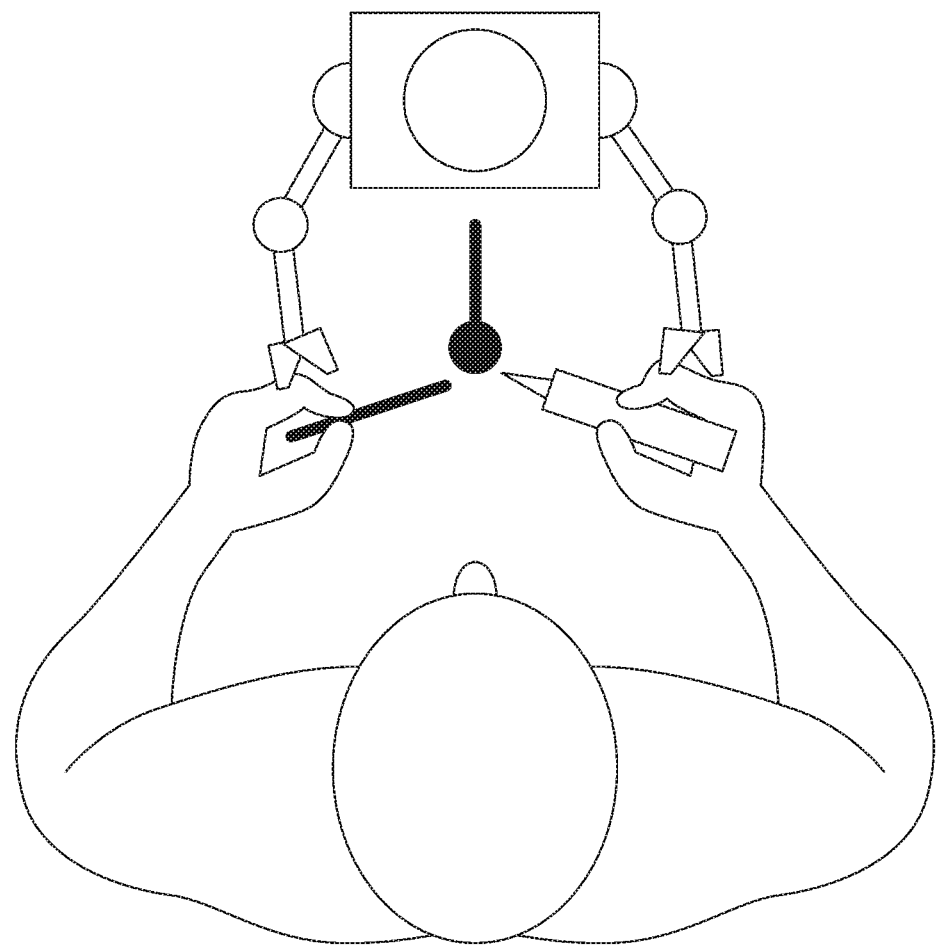
FIG. 16 is a view showing an example of a scenario in which a robot apparatus of a second embodiment performs teaching.

FIG. 16 is a view showing an example of a scenario in which the robot apparatus 200 of the second embodiment performs teaching. For example, the robot apparatus 200 teaches a person by guiding an arm of the person using the arm portion such that the predetermined work is completed. For example, in a case where the robot apparatus 200 teaches soldering to a person, the right arm of the person holding a soldering iron and the left arm of the person holding a solder are guided using the arm portion such that the solder is applied to a component in a predetermined state, and teaching is performed such that the tip of the soldering iron and the tip of the solder are brought into contact with each other for a predetermined time and the solder is appropriately applied to the component. For example, teaching is processing in which the processing of learning a skill according to the first embodiment is applied.

For example, the robot apparatus 200 acquires an image of the current surrounding environment and identifies the first work operation image similar to the acquired image. The robot apparatus 200 acquires the second work operation image related to the identified first work operation image and guides an arm of a person or the like such that position of the arm of the person, position of a tool held by the person, or the like matches position of the arm of the person, position of a tool held by the person, or the like of the second work operation image. For example, the robot apparatus 200 causes the tip of the soldering iron and the tip of the solder to be closer to each other based on the first instruction information for instructing a person which will be described below and moves the arm of the person by operating the arm portion such that the tips come into contact with each other.

At this time, the robot apparatus 200 derives out the moving amount and the moving direction of the arm of the person in a case where the arm portion is operated based on the drive command value of the first instruction information for instructing a person, derives out a second drive command value to be used in the subsequent processing based on the moving amount and the moving direction, and operates the arm portion based on the derived second drive command value. Accordingly, the robot apparatus 200 changes the guidance amount in accordance with the characteristics of the person such that the arm of the person matches a postulated operation. Teaching is performed by repeating this procedure such that the person can complete the work of soldering.

The robot apparatus 200 may perform teaching through a vocal guide or by causing a display (not shown) provided in the robot apparatus 200 to display an image of a sample of the work.

Figure 17:
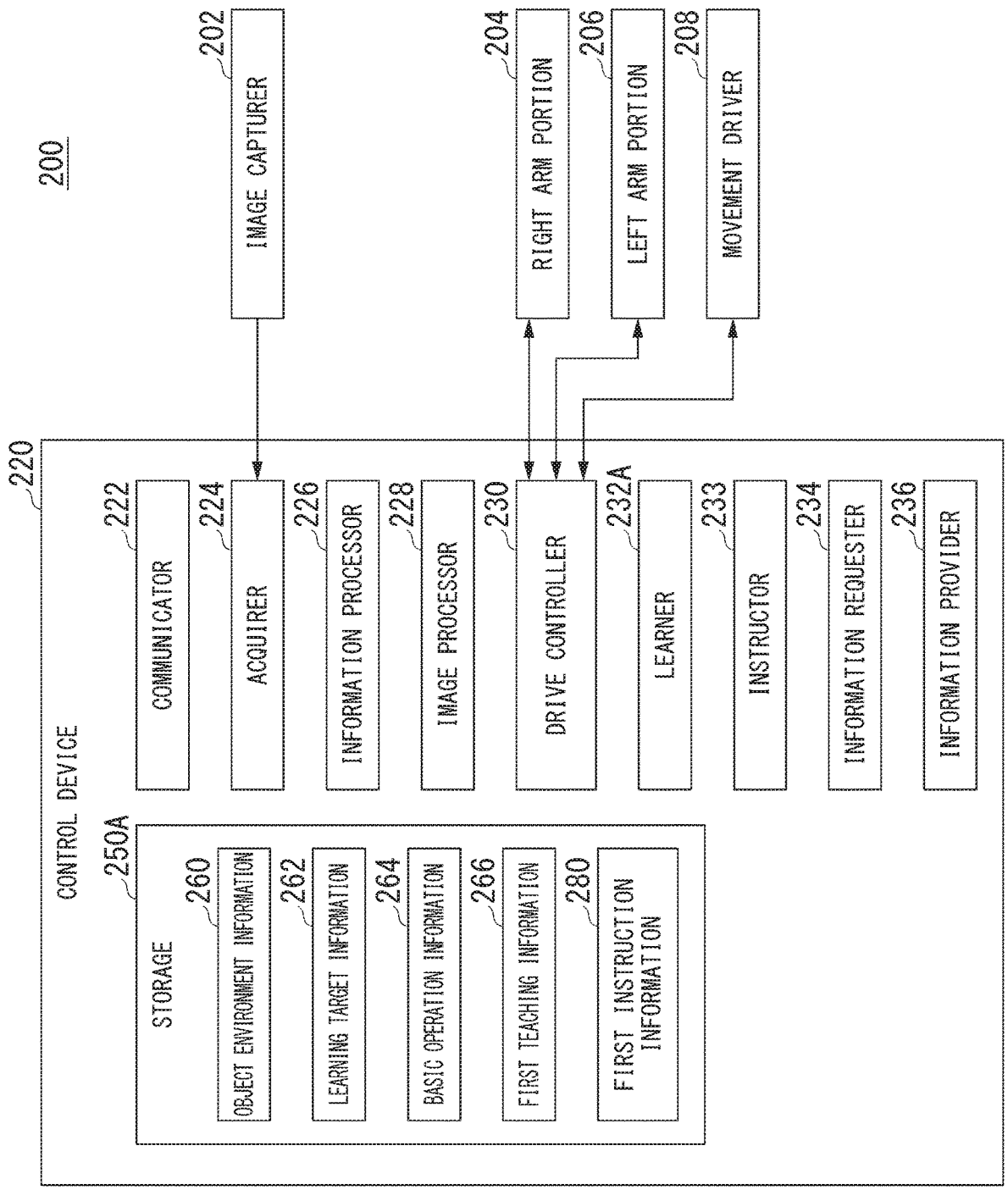
FIG. 17 is a view showing an example of a functional configuration of the robot apparatus of the second embodiment.

FIG. 17 is a view showing an example of a functional configuration of the robot apparatus 200A of the second embodiment. The robot apparatus 200A includes a learner 232A and a storage 250A, in place of the learner 232 and the storage 250 of the robot apparatus 200 of the first embodiment. The storage 250A stores first instruction information 280 for instructing a person in addition to information stored in the storage 250. This first instruction information 280 is generated by the learner 232A.

The learner 232A learns movement of persons in the first work operation image and the second work operation image and generates the first instruction information 280 based on the learned result. For example, the learner 232A derives out the moving amount and the moving direction of the soldering iron and the solder based on the positions of the soldering iron and the solder held by the person in the first work operation image and the positions of the soldering iron and the solder held by the person in the second work operation image. The learner 232A derives out a drive command value for operating the arm portion (for example, a drive command value for the arm portion to guide an arm of the person) with respect to the moving amount and the moving direction which have been derived out, based on a predetermined algorithm. The learner 232A causes information in which the moving amount, the moving direction, and the drive command value which have been derived out are associated with the first work operation image and the second work operation image to be stored in the storage 250A as the first instruction information 280.

The robot apparatus 200A further includes an instructor 233. The instructor 233 teaches a skill to a person based on the first instruction information 280. For example, the instructor 233 controls the arm portion via the drive controller 230 such that work is appropriately performed by guiding an arm of the person.

[Processing in which Person Learns Skill]

Figure 18:
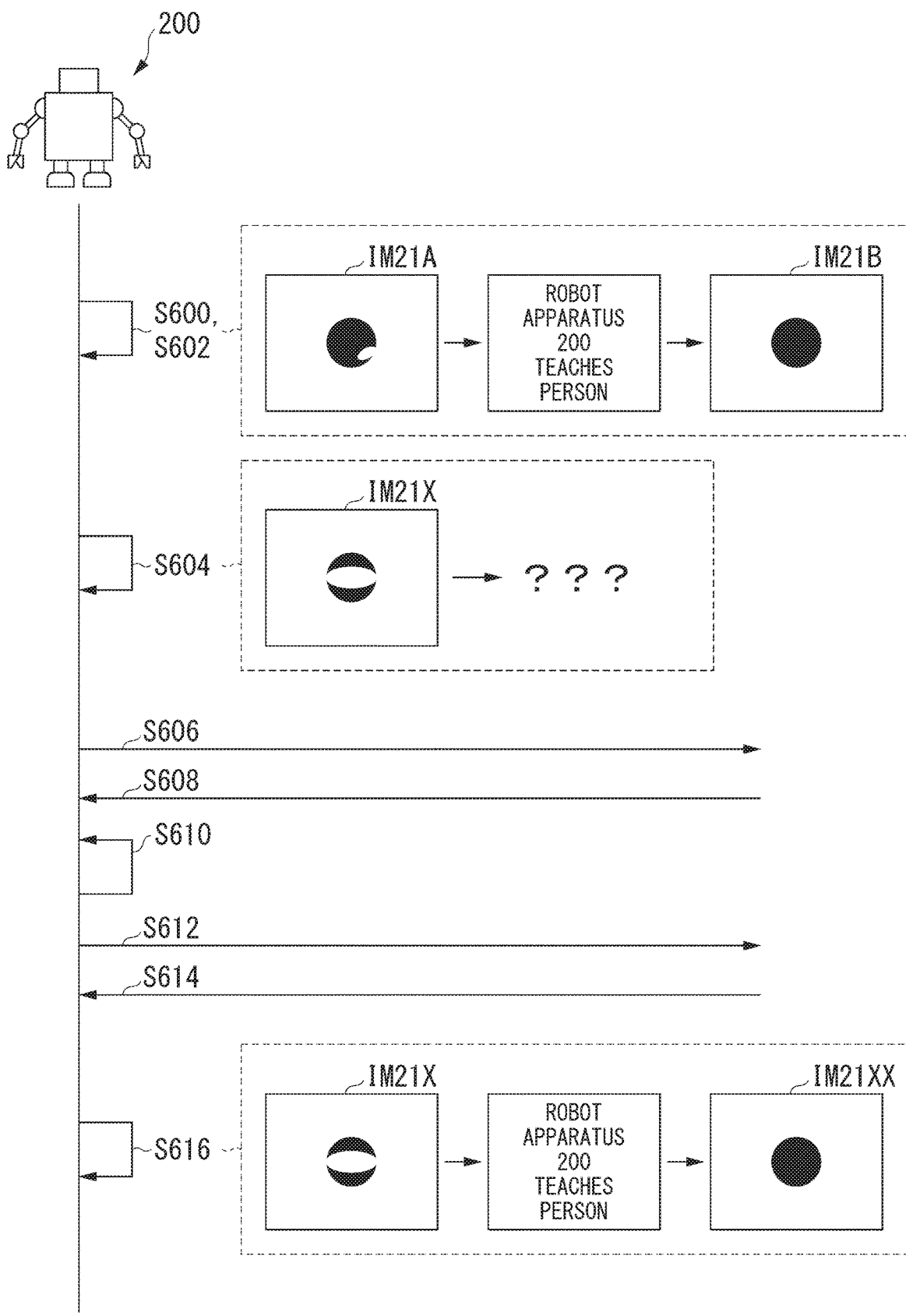
FIG. 18 is a flowchart showing an example of a flow of processing executed by the robot apparatus of the second embodiment.

FIG. 18 is a flowchart showing an example of a flow of processing executed by the robot apparatus 200A of the second embodiment. The processing of the present flowchart is executed when the robot apparatus 200 teaches a person as in FIG. 16.

First, the image processor 228 of the robot apparatus 200 acquires an image IM21A and identifies an identification image similar to the image IM21A in the first instruction information 280 (Step S600). The image IM21A is an image which is captured by the image capturer 202 of the robot apparatus 200 and in which the current surrounding environment is captured.

Next, with reference to the first instruction information 280, the drive controller 230 acquires a driving force command value associated with the identification image and drives the arm portion based on the acquired driving force command value (Step S602). For example, the drive controller 230 drives the arm portion in a state where the arm portion holds an arm of a person and guides the arm of the person. Accordingly, work is performed by the person and the work is completed as shown in an image IM21B.

Next, the image processor 228 acquires an image IM21X and attempts to identify an identification image similar to the image IM21X in the first instruction information 280 (Step S604). However, it is assumed that the image processor 228 cannot identify an identification image similar to the image IM21X. That is, it is assumed that the robot apparatus 200 does not have instruction information for instructing a person regarding an operation in a surrounding environment related to the image IM21X. In this case, since the robot apparatus 200 cannot cope with the surrounding environment, the information requester 234 requests different apparatuses to provide information related to teaching, such as a drive command value for coping with the surrounding environment related to the image IM21X.

First, the information requester 234 inquires of different robot apparatuses 200 whether or not information for teaching is retained (Step S606). That is, the information requester 234 checks for a method for coping with specific work. The specific work is work that the robot apparatus 200 cannot instruct the person based on the instruction information for instructing a person (the first instruction information 280). Next, the information requester 234 acquires an inquiry result from a different robot apparatus 200 (Step S608). Next, the information requester 234 determines whether or not the different robot apparatus 200 retains the information for teaching, based on the inquiry result (Step S610).

In a case where it is determined that the information for teaching is not retained, the information requester 234 inquires of the edge server apparatus 100 whether or not the information for teaching is retained (Step S612). Next, the information requester 234 acquires an inquiry result from the edge server apparatus 100 (Step S614). Here, it is assumed that the information requester 234 acquires the information for teaching. For example, acquired information for teaching (newly acquired instruction information for instructing specific work) denotes a drive command value for guiding an arm of a person by operating the arm portion in the surrounding environment of the image IM21X or a scenario of the drive command value. The learner 232A acquires the drive command value or the scenario of the drive command value and learns the method for coping with specific work. For example, learning denotes that the learner 232A causes the acquired scenario to be stored in the storage 250A as instruction information for instructing a person.

Next, the instructor 233 drives the arm portion based on the information for teaching and guides an arm of a person (Step S616). That is, the instructor 233 instructs a person regarding specific work based on a coping method learned by the learner 232A (newly acquired instruction information for instructing specific work). Accordingly, work is performed, and the work is completed as shown in an image IM21XX.

The robot apparatus 200 or the edge server apparatus 100 may estimate the skill learning level of the robot apparatus 200 based on the frequency of occurrence of work in which a person cannot be instructed in a predetermined environment by repeating the foregoing processing. For example, in a case where it is determined based on the inquiry result from the robot apparatus 200 that the frequency of occurrence of work in which a person cannot be instructed is equal to or lower than a threshold, the edge-side information processor (example of "an estimator") 106 of the edge server apparatus 100 estimates that the skill learning level of the robot apparatus 200 is high. Accordingly, the robot apparatus 200 can more easily recognize the skill learning level.

As described above, the robot apparatus 200A can make a person having no skill related to the work learn the skill, by performing teaching. Moreover, even in a case where the robot apparatus 200A has no information for teaching, the robot apparatus 200A can acquire the information for teaching from different apparatuses and can make a person learn the skill using the acquired information for teaching.

In the foregoing example, information related to the coping method regarding specific work is acquired from different apparatuses. However, in place thereof, information related to the coping method may be acquired from a person. In this case, for example, a person may instruct the robot apparatus 200 regarding the coping method by voice, a gesture, or hand movement or by guiding the arm portion. The robot apparatus 200 may learn the coping method regarding specific work based on information instructed by a person (newly acquired instruction information for instructing specific work).

[Processing of Determining Whether or not Person has Learned Skill]

Figure 19:
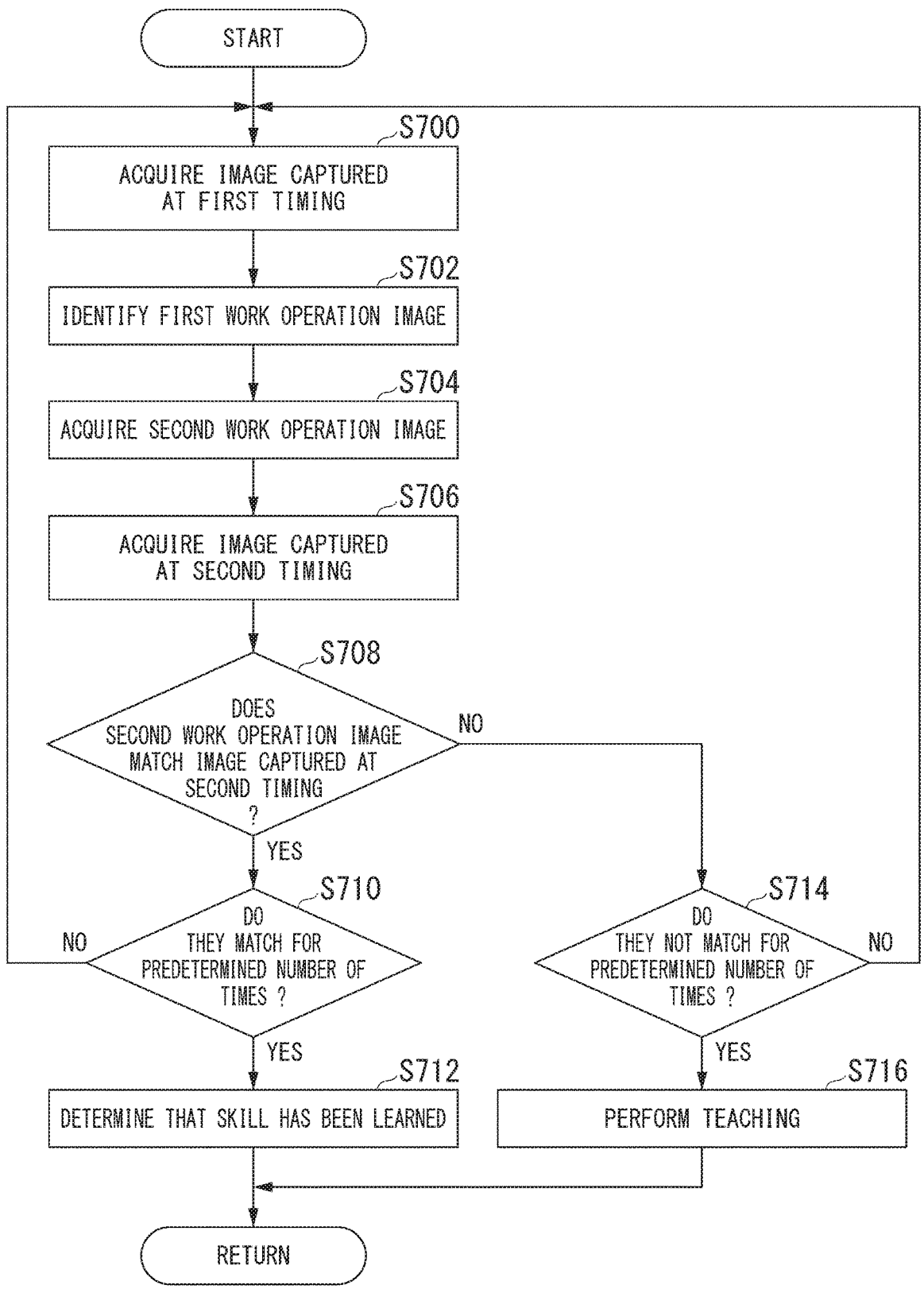
FIG. 19 is a flowchart showing another example of a flow of processing executed by the robot apparatus of the second embodiment.

FIG. 19 is a flowchart showing another example of a flow of processing executed by the robot apparatus 200A of the second embodiment. The processing of the present flowchart is processing in which after the robot apparatus 200A performs teaching to a person, the robot apparatus 200 monitors the work performed by the person and determines whether or not the person learns the skill.

First, the image processor 228 of the robot apparatus 200 acquires a first captured image captured at a first timing (Step S700). Next, with reference to the first instruction information 280, the image processor 228 identifies the first work operation image similar to the first captured image (Step S702). Next, the image processor 228 acquires the second work operation image related to the first work operation image (Step S704). Next, the image processor 228 acquires a second captured image captured at a second timing (Step S706).

Next, the image processor 228 determines whether or not the acquired second work operation image matches the second captured image captured at the second timing (Step S708). In a case where the acquired second work operation image matches the image captured at the second timing, it is considered that work satisfying a predetermined reference has been performed by a person, and the information processor 226 determines whether or not the acquired second work operation image matches the image captured at the second timing for a predetermined number of times (Step S710). In the processing of Step S710, in a case where it is determined that they do not match each other for a predetermined number of times, the procedure returns to Step S700.

In the processing of Step S710, in a case where it is determined that they match each other for a predetermined number of times, the information processor 226 determines that a person has learned the skill (Step S712). In a case where the information processor 226 determines that a person has learned the skill, the robot apparatus 200 may determine that the host apparatus has learned the skill. In this manner, the information processor 226 may determine the skill learning level of the host apparatus based on the work learning level of a person who has been instructed regarding the predetermined work. For example, in a case where a target person has learned the skill, the robot apparatus 200A performs teaching to another person.

In a case where the acquired second work operation image does not match the image captured at the second timing, it is considered that work satisfying a predetermined reference has not been performed by a person, and the information processor 226 determines a predetermined number of times whether or not the acquired second work operation image does not match the image captured at the second timing (Step S714). In the processing of Step S714, in a case where it is not determined that they do not match each other for a predetermined number of times, the procedure returns to Step S700. In the processing of Step S714, in a case where it is determined that they do not match each other for a predetermined number of times, the information processor 226 determines that a person has not learned the skill and performs teaching again to the person (Step S716). Accordingly, processing of one routine of the present flowchart ends.

As described above, the robot apparatus 200A can determine whether or not a person who has not learned the skill related to work learns the skill. In a case where the person has not learned the skill, the robot apparatus 200A can perform teaching such that the skill is improved.

According to the second embodiment described above, the robot apparatus 200 can instruct a person regarding specific work based on the learned result of the learner 232A. Even in a case where specific work occurs, the robot apparatus 200 can learn the method for coping with the specific work based on newly acquired instruction information for instructing the specific work and can instruct a person regarding the specific work based on the learned result. In this manner, instruction capability of the robot apparatus 200 can be improved more simply.

Third Embodiment

Hereinafter, a third embodiment will be described. In the third embodiment, the edge server apparatus 100 determines whether or not to provide the skill which the robot apparatus 200 has learned to the center server apparatus 10 in accordance with the characteristics of the information. Hereinafter, the differences between the first embodiment or the second embodiment and the present embodiment will be described.

Figure 20:
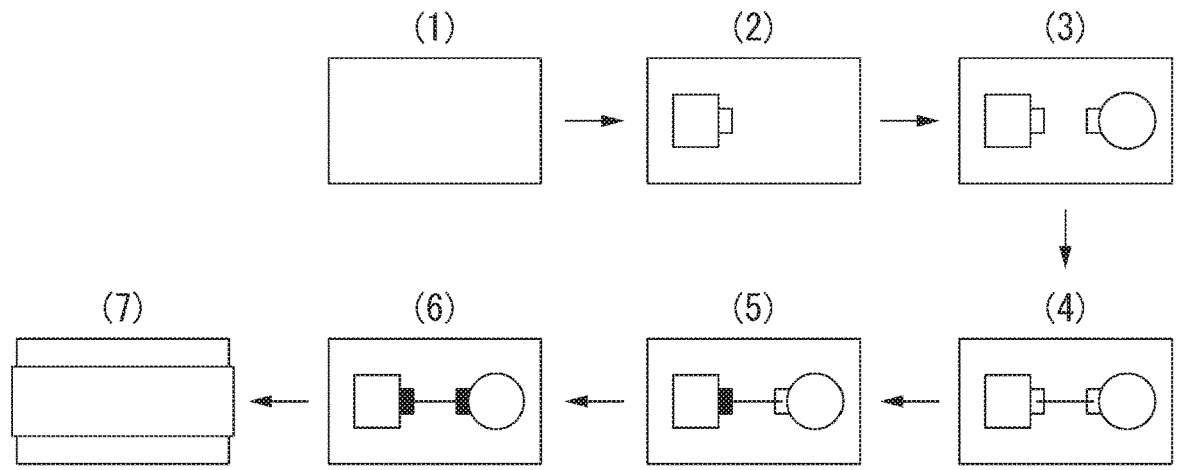
FIG. 20 is a view showing an example of a scenario in which the robot apparatus produces a component based on a learned skill.

FIG. 20 is a view showing an example of a scenario in which the robot apparatus 200 produces a component based on a learned skill. (1) The robot apparatus 200 disposes a substrate A at a predetermined position, (2) a component a is disposed at a first predetermined position on the substrate A, and (3) a component b is disposed at a second predetermined position. (4) The robot apparatus 200 disposes a wiring connecting the component a and the component b to each other, (5) a solder is applied to a third predetermined position, (6) a solder is applied to a fourth predetermined position, and the components a and b and the wiring are covered with a cover A. (7) Accordingly, a component A is completed. In a case where the robot apparatus 200 learns such a skill, the acquired skill is uploaded to the edge server apparatus 100.

Figure 21:
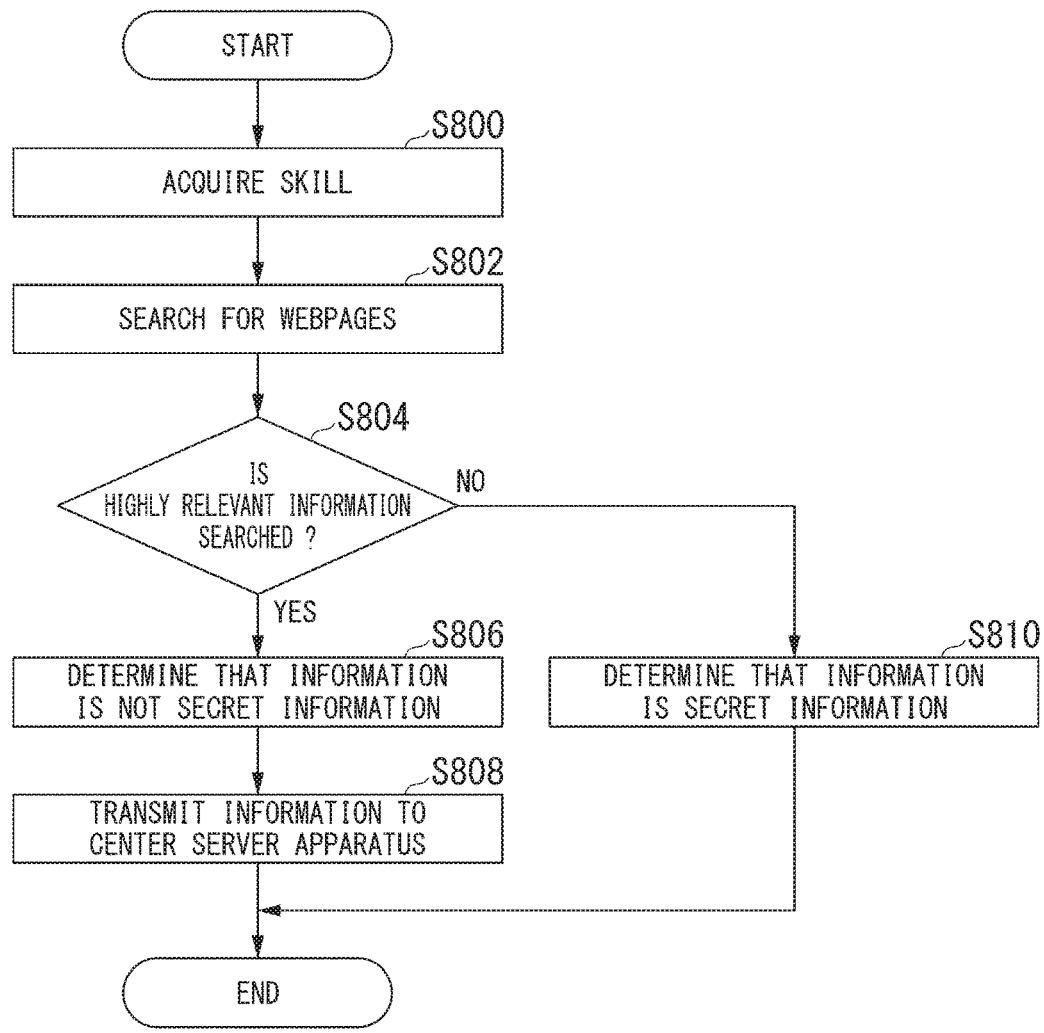
FIG. 21 is a flowchart showing an example of a flow of processing executed by the edge server apparatus.

FIG. 21 is a flowchart showing an example of a flow of processing executed by the edge server apparatus 100. The edge-side acquirer 104 acquires the information related to the skill which is uploaded by the robot apparatus 200 (Step S800). Next, the edge-side information processor (example of "a secret determiner") 106 performs web searching based on the acquired uploaded information related to the skill (Step S802). Next, during web searching, the edge-side information processor 106 determines whether or not information highly relevant to the uploaded information related to the skill is searched for (Step S804).

For example, the edge-side information processor 106 generates a query in accordance with a predetermined reference and causes a search engine (not shown) to execute searching using the generated query. The edge-side information processor 106 acquires a search result. For example, the edge-side information processor 106 collects information related to "the component A" of the query and extracts information highly relevant (information of which the relevance is equal to or higher than a threshold) to the inside of the component A, a producing technique, and the like from the collected information, based on an algorithm set in advance. For example, highly relevant information denotes an image similar to an image in a producing process of the component A, or information of disclosure or the like of the generating process or the internal structure of the component A. For example, an algorithm set in advance denotes an algorithm for converting information indicated by an image into writing, or an algorithm for interpreting the disclosed writing or the meaning of an image.

For example, the edge-side information processor 106 converts information indicated by an image of the component A into writing and extracts the meaning of the converted writing. The edge-side information processor 106 extracts images in webpages or the meaning of the writing. The edge-side information processor 106 compares the meanings thereof and identifies highly relevant information.

In a case where highly relevant information is searched in Step S804, the edge-side information processor 106 determines that the information related to the skill is not secret information (Step S806), and transmits the information to the center server apparatus 10 (Step S808). The center server apparatus 10 acquires the information transmitted by the edge server apparatus 100 and causes the acquired information to be stored in a storage 50. In a case where there is a request of transmitting stored information, the center server apparatus 10 transmits the information stored in the storage 50 to the request source in response to the transmission request. In a case where highly relevant information is not searched in Step S804, the edge-side information processor 106 determines that the information related to the skill is secret information and does not transmit the information (Step S810). Accordingly, processing of one routine of the present flowchart ends.

According to the third embodiment described above, in a case where it is determined that the identification information transmitted by the robot apparatus 200 is not open to the public (in a case where it is determined that the identification information is not open to the general public), the edge server apparatus 100 determines that the information is secret information and does not open the information to the public. As a result, secret information can be administered as an asset without being open to the public.

Handling of secret information (information acquired by the robot apparatus 200) may be set as follows. For example, the robot apparatus 200 may determine whether or not target information is secret information based on a predetermined reference. The edge server apparatus 100 may search for information similar to the acquired information every predetermined period and may analyze the search result. Accordingly, it is possible to provide information for the administrator recognizing a change in information related to the acquired information (for example, the skill). The edge server apparatus 100 may regularly aggregate the acquired information, notify the administrator of the aggregated result, and determine whether or not to open the information to the public based on the instruction of the administrator.

A part of the processing of the flowchart in the present embodiment may be omitted, and the order of steps of the processing may be switched. In the present embodiment, some or all of the details of the embodiments may be combined and implemented.

[Hardware Configuration]

Figure 22:
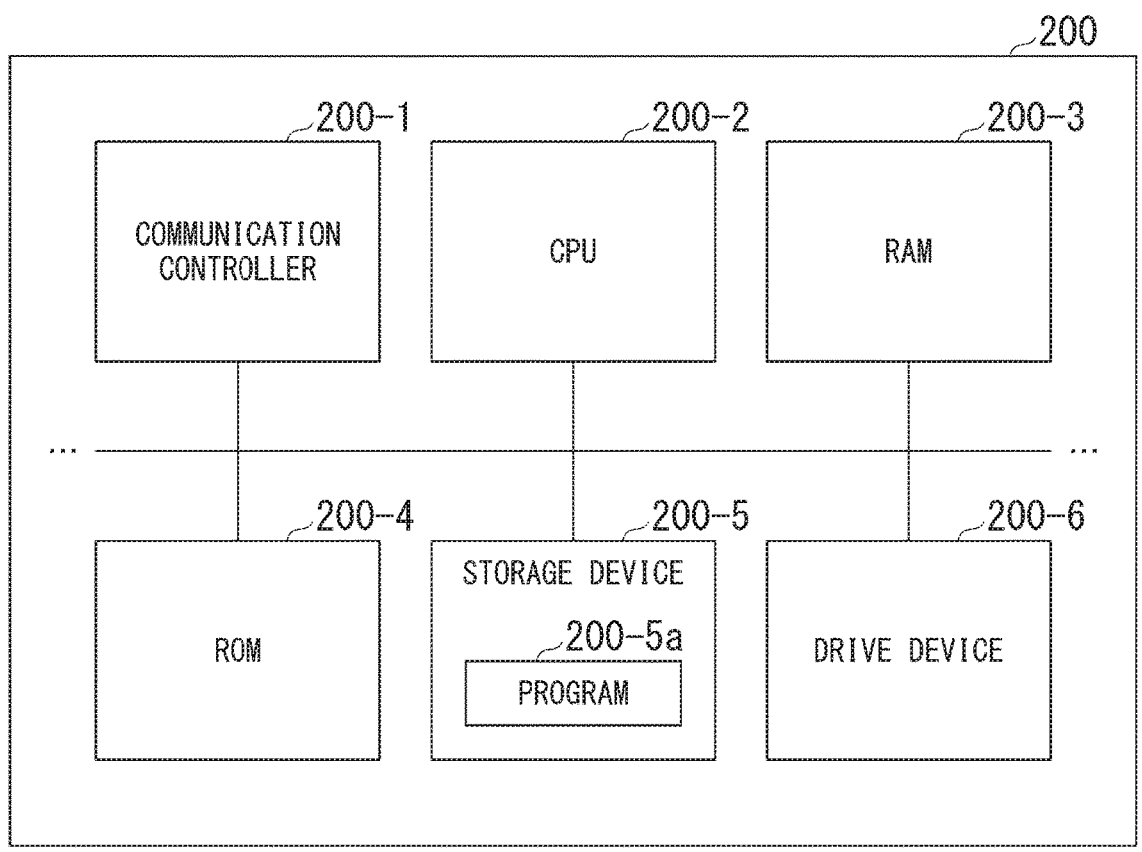
FIG. 22 is a view showing an example of a configuration of hardware of the robot apparatus according to the embodiment.

FIG. 22 is a view showing an example of a configuration of hardware of the robot apparatus 200 according to the embodiment. As shown in the diagram, the robot apparatus 200 has a configuration in which a communication controller 200-1, a CPU 200-2, a random access memory (RAM) 200-3 used as a working memory, a read only memory (ROM) 200-4 storing a booting program and the like, a storage device 200-5 such as a flash memory or a hard disk drive (HDD), the drive device 200-6, and the like are connected to each other through an internal bus or a dedicated communication line. The communication controller 200-1 performs communication with the constituent elements other than the robot apparatus 200. A storage device 200-5 stores a program 200-5a executed by the CPU 200-2. This program is deployed in the RAM 200-3 by a direct memory access (DMA) controller (not shown) or the like and is executed by the CPU 200-2. Accordingly, some or all of the acquirer 224, the information processor 226, the image processor 228, the drive controller 230, the learner 232, the information requester 234, and the information provider 236 are executed.

The embodiments described above can be expressed as follows.

There is provided a robot apparatus configured to include a storage device that stores a program and first teaching information which serves as a guide to first work operation, and a hardware processor. The hardware processor executes the program stored in the storage device to acquire second teaching information which serves as a guide to second work operation similar to the first work operation or second work operation related to the first work operation from a different apparatus having the second teaching information, and perform the first work operation based on the first teaching information stored in the storage device and the second work operation based on the acquired second teaching information.

Hereinabove, forms of performing the present invention have been described using the embodiments. However, the present invention is not limited to such embodiments in any way, and various changes and replacements can be added thereto within a range not departing from the gist of the present invention.

What is claimed is:

1. A robot apparatus comprising:
   a storage configured to store first instructional information which serves as a guide to first work operation;
   an acquirer configured to acquire second instructional information which serves as a guide to second work operation similar to the first work operation or second work operation related to the first work operation directly from a different robot apparatus having the second instructional information without going through a server device, functions of the robot apparatus and functions of the different robot apparatus are the same functions;
   a work controller configured to perform the first work operation based on the first instructional information stored in the storage and the second work operation based on the second instructional information acquired by the acquirer, and
   a processor configured to:
   acquire an update notification directly from the different robot apparatus without going through the server device and determine whether or not update conditions for learning a new skill are satisfied, the update notification indicates that the different robot apparatus learned the new skill;
   acquire instructional information that is related to the new skill directly from the different robot apparatus without going through the server device in a case that the update conditions are satisfied; and
   learn the new skill based on the instructional information provided by the different robot apparatus,
   wherein the update conditions are that an estimated time for updating the instructional information can be ensured or the robot apparatus has not learned the new skill.

2. The robot apparatus according to claim 1, further comprising:
   a learner configured to learn a guide to third work; and
   an information provider configured to notify a different apparatus of information indicating that the guide to the third work has been learned, in a case where the learner learns the guide to the third work.

3. The robot apparatus according to claim 1, further comprising:
   an instructor configured to instruct a person regarding work; and
   a learner configured to learn a method for coping with specific work based on instruction information for instructing the person regarding the newly acquired specific work when the specific work occurs in a case where the instructor instructs the person regarding predetermined work, the specific work being work the robot apparatus cannot instruct the person
   wherein the instructor instructs the person regarding the specific work based on a learned result of the learner.

4. A robot system comprising:
   the robot apparatus according to claim 3; and
   an estimator configured to estimate a skill learning level of the robot apparatus based on a frequency of occurrence of the specific work in a predetermined environment.

5. A robot system comprising:
   the robot apparatus according to claim 1;
   a secret determiner configured to determine whether or not the instructional information which is a guide to work transmitted by the robot apparatus is secret information; and
   a provider configured to provide the instructional information to a different apparatus in response to a request of the different apparatus in a case where the secret determiner determines that the instructional information is not secret information, and not to provide the instructional information to the different apparatus even if there is the request from the different apparatus in a case where the secret determiner determines that the instructional information is secret information.

6. The robot system according to claim 5,
   wherein the secret determiner determines whether or not information matching the information transmitted by the robot apparatus is open to the public and determines that the instructional information is not secret information in a case where the secret determiner determines that the information transmitted by the robot apparatus is open to the public.

7. A method comprising:
storing, by a robot apparatus comprising a controller, first instructional information which serves as a guide to first work operation;
acquiring, by the robot apparatus, second instructional information which serves as a guide to second work operation similar to the first work operation or second work operation related to the first work operation directly from a different apparatus having the second instructional information without going through a server device, functions of the robot apparatus and functions of the different apparatus are the same functions;
performing, by the robot apparatus, the first work operation based on the first instructional information stored in a storage storing the first instructional information which serves as a guide to the first work operation and the second work operation based on the acquired second instructional information;
acquiring, by the robot apparatus, an update notification directly from a first robot apparatus, different from the robot apparatus, without going through the server device:
determining, by the robot apparatus, whether or not update conditions for learning a new skill are satisfied, the update notification indicates that the first robot apparatus learned the new skill;
acquiring, by the robot apparatus, instructional information that is related to the new skill directly from the first robot apparatus without going through the server device in a case that the update conditions are satisfied; and
learning, by the robot apparatus, the new skill based on the instructional information provided by the first robot apparatus,
wherein the update conditions are that an estimated time for updating the instructional information can be ensured or the robot apparatus has not learned the new skill.

8. A robot apparatus comprising:
a storage configured to store first instructional information which serves as a guide to first work operation;
an acquirer configured to acquire second instructional information which serves as a guide to second work operation similar to the first work operation or a second work operation related to the first work operation directly from a different robot apparatus having the second instructional information without going through a server device, functions of the robot apparatus and functions of the different robot apparatus are the same functions;
a work controller configured to perform the first work operation based on the first instructional information stored in the storage and the second work operation based on the second instructional information acquired by the acquirer, and an information requester configured to:
inquire of a plurality of robot apparatuses, having functions that are the same functions of the robot apparatus, whether or not the second instructional information which serves as a guide to the second work operation is retained in a case where the robot apparatus plans to perform the second work operation and has not retained the second instructional information, and
not inquire of the plurality of robot apparatuses in a case where the robot apparatus plans to perform the first work operation,
wherein the acquirer acquires the second instructional information from at least one of a robot apparatus of the plurality of robot apparatuses, including the different robot apparatus, based on an inquiry by the information requester,
the work controller performs the first work operation based on the first instructional information stored in the storage in a case where the robot apparatus plans to perform the first work operation, and
the work controller performs the second work operation based on the second instructional information acquired by the acquirer in a case where the robot apparatus plans to perform the second work operation.

9. The robot apparatus according to claim 8,
wherein, in a case where the plurality of robot apparatuses have not retained the second instructional information based on a result of the inquiry by the information requester after the information requester inquires of the plurality of robot apparatuses whether or not the second instructional information is retained, inquire, of a first server device that communicates with the plurality of robot apparatuses, whether or not the first server device has retained the second instructional information.

10. The robot apparatus according to claim 9, further comprising:
a second server device that manages a second robot group including the plurality of robot apparatuses, the second robot group being different from a first robot group,
wherein the first server device manages the first robot group including the plurality of robot apparatuses, and
wherein the first server device:
transmits the second instructional information to the robot apparatus in a case where the first server device has retained the second instructional information, and
acquires the second instructional information that the second server device has retained from the second server device via a network in a case where the first server device has not retained the second instructional information and transmits the second instructional information acquired by the acquirer to the robot apparatus.

* * * * *